(12) United States Patent
Newgent

(10) Patent No.: US 12,140,128 B2
(45) Date of Patent: Nov. 12, 2024

(54) UNIFIED AIR COMPRESSOR

(71) Applicant: Michael Newgent, Kapaa, HI (US)

(72) Inventor: Michael Newgent, Kapaa, HI (US)

( * ) Notice: Subject to any disclaimer, the term of this patent is extended or adjusted under 35 U.S.C. 154(b) by 65 days.

(21) Appl. No.: 18/200,775

(22) Filed: May 23, 2023

(65) Prior Publication Data
US 2023/0287889 A1    Sep. 14, 2023

Related U.S. Application Data

(63) Continuation-in-part of application No. 17/719,591, filed on Apr. 13, 2022, now Pat. No. 11,698,060.

(60) Provisional application No. 63/174,038, filed on Apr. 13, 2021.

(51) Int. Cl.
| | |
|---|---|
| *F04B 27/06* | (2006.01) |
| *F04B 27/04* | (2006.01) |
| *F04B 35/00* | (2006.01) |
| *F04D 17/10* | (2006.01) |
| *F04D 25/06* | (2006.01) |
| *H02K 1/2792* | (2022.01) |
| *H02K 7/18* | (2006.01) |

(52) U.S. Cl.
CPC ...... *F04B 27/0657* (2013.01); *F04B 27/0409* (2013.01); *F04B 35/00* (2013.01); *F04D 17/10* (2013.01); *F04D 25/06* (2013.01); *H02K 1/2792* (2022.01); *H02K 7/1823* (2013.01)

(58) Field of Classification Search
CPC ............. F04B 27/0657; F04B 27/0663; F04B 27/065; F04B 27/06; F04B 35/00; F04B 27/0409; F04B 27/053; F04B 1/10; F04B 1/113; F04B 1/1133; F04B 1/1136; H02K 1/2792; H02K 7/02
USPC .................................................. 417/223, 269
See application file for complete search history.

(56) References Cited

U.S. PATENT DOCUMENTS

| | | | | | |
|---|---|---|---|---|---|
| 1,557,434 | A | * | 10/1925 | Demarest ............ | F04B 27/0657 417/462 |
| 2,123,391 | A | * | 7/1938 | Whitfield .............. | F04B 39/064 92/144 |
| 2,127,550 | A | * | 8/1938 | Cocanour ........... | F04B 27/0657 92/79 |
| 2018/0187664 | A1 | * | 7/2018 | Bassine ................. | F04B 27/005 |

* cited by examiner

*Primary Examiner* — Bryan M Lettman
(74) *Attorney, Agent, or Firm* — L/O of ALEXIS J SAENZ

(57) ABSTRACT

A gas compressor includes an incompressible fluid source for storing an incompressible fluid. A rotary shaft is coupled to the incompressible fluid source. Operation of the rotary shaft draws the incompressible fluid up or down the rotary shaft. A piston chamber is coupled to each piston in a set of pistons. The incompressible fluid is delivered to the first piston by a controlled fluid valve assembly, to drive the first piston. The centripetal force from the rotation of the rotary shaft and the force of incompressible fluid from an impeller drive the first piston to compress a gas in the piston chamber of the first piston. The incompressible fluid is released from the first piston, by the controlled fluid valve assembly. The incompressible fluid is alternately delivered to the second piston to drive the second piston and compress gas.

12 Claims, 57 Drawing Sheets

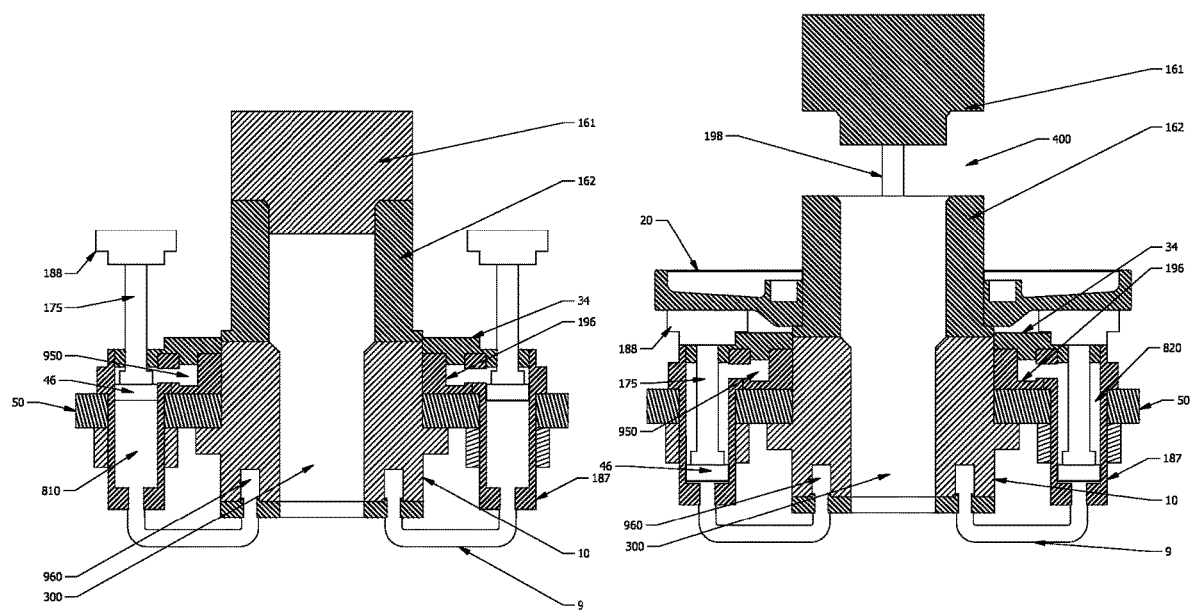

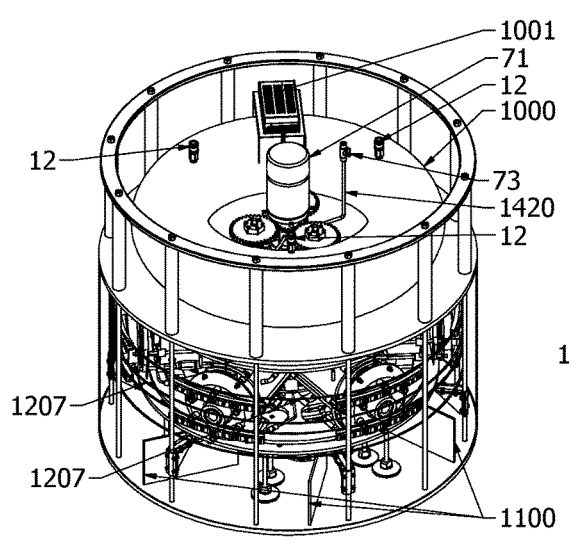
FIG. 72
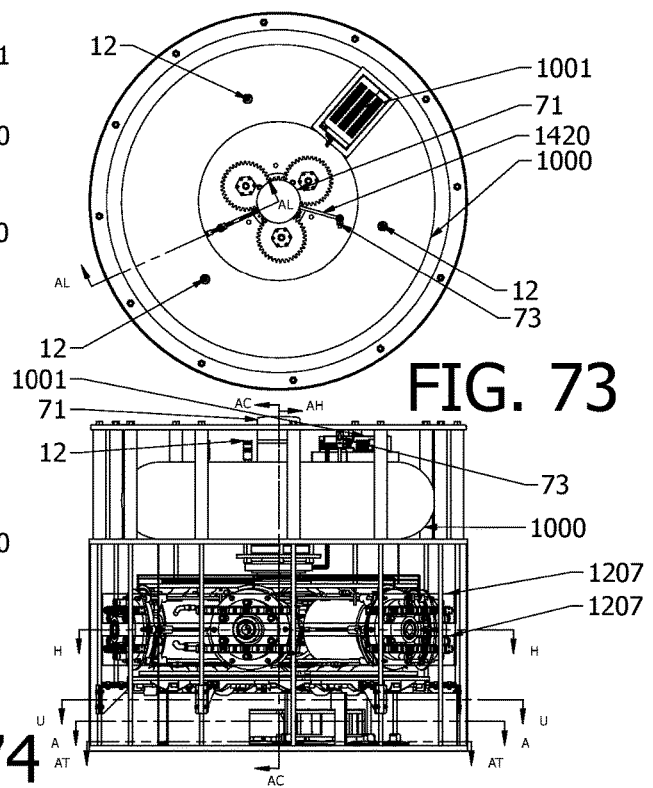
FIG. 73
FIG. 74

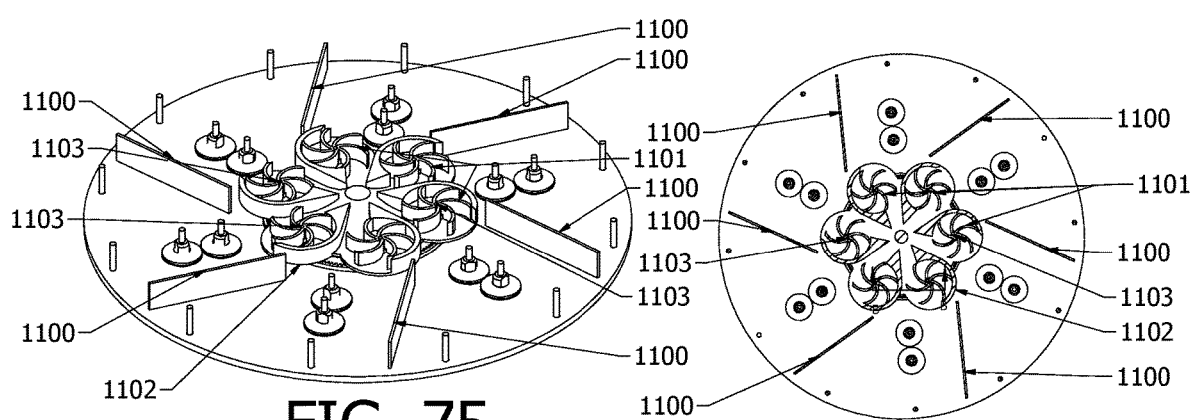
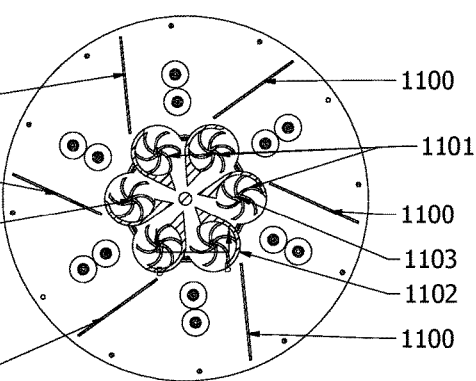
FIG. 75
FIG. 76
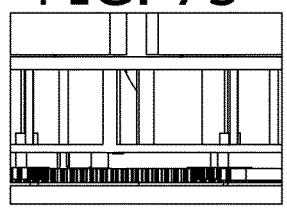
FIG. 77

SECTION U

SECTION V

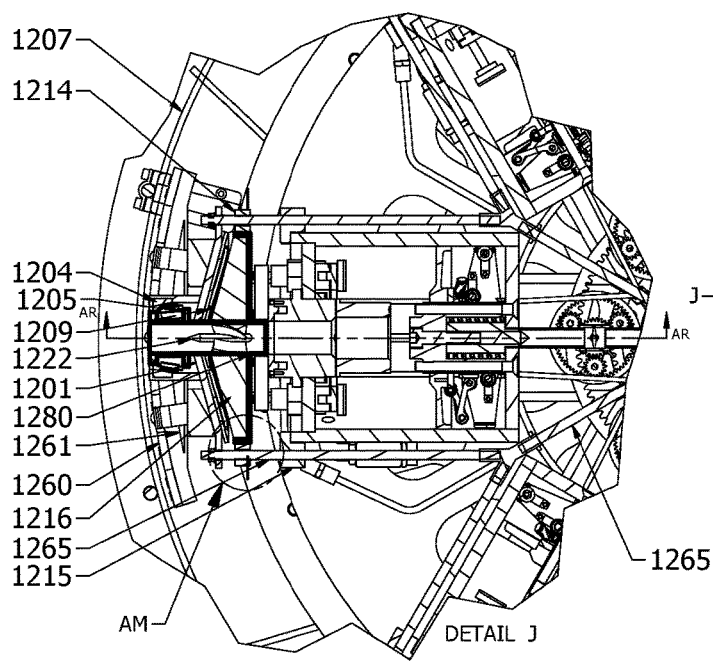
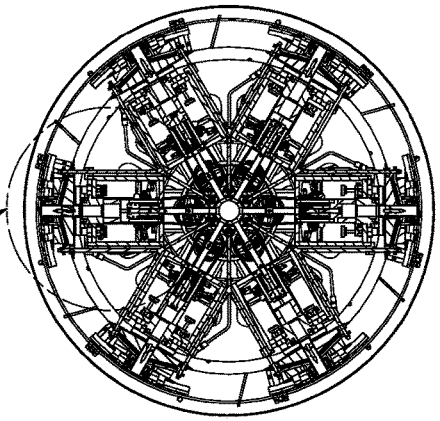
FIG. 80
FIG. 81

SECTION Y

SECTION T

SECTION AA

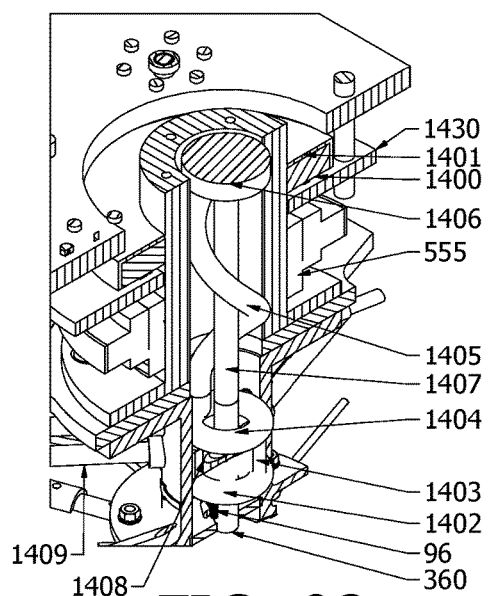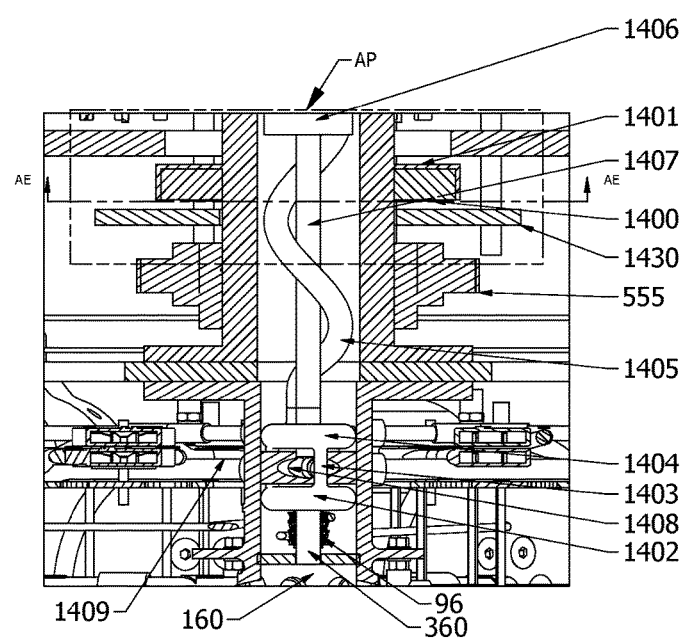

DETAIL AP

SECTION AE

SECTION AL

DETAIL AM  FIG. 101

DETAIL AN

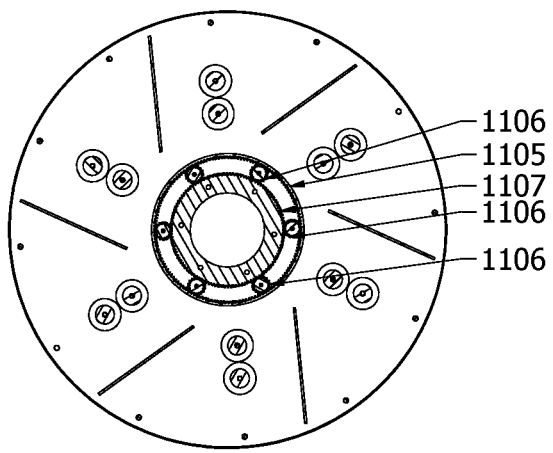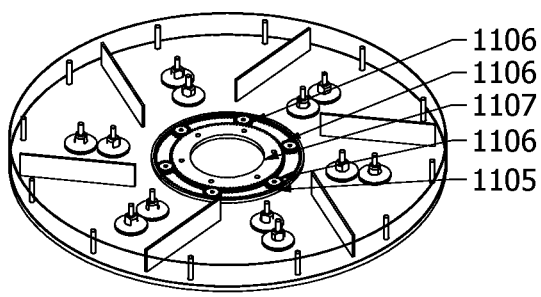
SECTION AT
FIG. 104
FIG. 105

UNIFIED AIR COMPRESSOR

CROSS-REFERENCE TO RELATED APPLICATIONS

This application claims benefit under 35 U.S.C. § 119 of U.S. application Ser. No. 17/719,591, filed Apr. 13, 2022, which claimed benefit of priority to U.S. Provisional Application having Ser. No. 63/174,038 filed Apr. 13, 2021, which are hereby incorporated by reference herein in its entirety.

FIELD

The subject disclosure relates to compressor systems, and more particularly, to a unified air compressor.

BACKGROUND

Air compressors work by forcing air into a container and pressurizing it. Then, the air is forced through an opening in the tank, where pressure builds up. The general types of air compressors include rotary screw, rotary vane, reciprocating piston types (single and two-stage varieties), axial, and centrifugal.

SUMMARY

In one aspect of the disclosure, a gas compressor is provided. The gas compressor includes an incompressible fluid source for storing an incompressible fluid and a rotational driving input source. A rotary shaft is coupled to the incompressible fluid source. Operation of the rotary shaft draws the incompressible fluid up or down the rotary shaft. A set of pistons is coupled to the rotational driving input source. The set of pistons includes a first piston coupled to a second piston. The first piston is positioned in a first pressure chamber and the second piston is positioned in a second pressure chamber. The rotational driving input source drives a centripetal actuation of the first piston and of the second piston. A compressible gas source is coupled to the first pressure chamber and to the second pressure chamber. A controlled fluid valve assembly is coupled to the first pressure chamber and to the second pressure chamber. The incompressible fluid is delivered to the first piston by the controlled fluid valve assembly, to drive the first piston, wherein driving the first piston compresses the compressible gas in the first pressure chamber. The incompressible fluid is released from the first pressure chamber, by the controlled fluid valve assembly. The incompressible fluid is alternately delivered to the second pressure chamber by the controlled fluid valve assembly to drive the second piston, in the event the incompressible fluid is released from the first pressure chamber. Driving the second piston compresses the compressible gas in the second pressure chamber. Compressed gas from the first pressure chamber and from the second pressure chamber is released through a port to provide a source of the compressed gas.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 69 is a cross-sectional side view of a hydraulic actuator assembly for the outboard side of the system, in a closed state, taken along the line X-X in FIG. 56, according to an illustrative embodiment.

FIG. 70 is a cross-sectional side view of a hydraulic actuator assembly for the outboard side of the system, in an open state, taken along the line X-X in FIG. 56, according to an illustrative embodiment.

FIG. 72 is a top perspective view of a gas compressor system in accordance with another embodiment of the subject technology.

FIG. 73 is a top view of the system of FIG. 72.

FIG. 74 is a side view of the system of FIG. 72.

FIG. 75 is a top, perspective isolated view of a hydraulic assembly consistent with embodiments of the subject technology.

FIG. 76 is a top view of the hydraulic assembly of FIG. 75.

FIG. 77 is a side view of detail B in FIG. 76.

FIG. 80 is an enlarged view of circle J in FIG. 81.

FIG. 81 is an isolated top view of a piston assembly of the gas compressor system of FIG. 72 consistent with embodiments of the subject technology.

FIG. 92 is a perspective view of a rotary union of the gas compressor system of FIG. 72 consistent with embodiments.

FIG. 93 is an enlarged sectional view of the rotary union of FIG. 92 taken along the line AC-AC of FIG. 74.

FIG. 104 is a top view of a gear assembly taken along the line AT-AT of FIG. 74.

FIG. 105 is a perspective top view of the gear assembly of FIG. 104.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

In general, exemplary embodiments of the subject technology provide a gas compressor system that integrates different types of sources of force to compress gas. In an illustrative embodiment, centripetal forces, fluid pressure from an impeller, and a piston system drive an incompressible fluid to compress the gas. Higher compression levels can be achieved when unifying these sources of force to create compression. In another aspect, driving a piston(s) away from the central axis of the system provides additional force to the compression. This will increase centripetal forces which help to compress the gas. Moreover, as will be appreciated, by integrating the different types of force, the system operates more efficiently since the burden of producing compression is provided in the aggregate by more than one source.

Referring now to FIGS. 1-5, a gas compressor system (sometimes referred to generally as the "system") is shown according to an illustrative embodiment. In general, the system includes a rotational source 71, one or more compressible fluid source/storage tanks 79, and an incompressible fluid source tank 88. In some embodiments, a rotation assembly may be partially or wholly situated in the tank 88. In an illustrative embodiment, the tank 79 stores air or other type of compressible gas. The tank 88 stores water or other type of incompressible liquid.

Figure 11:
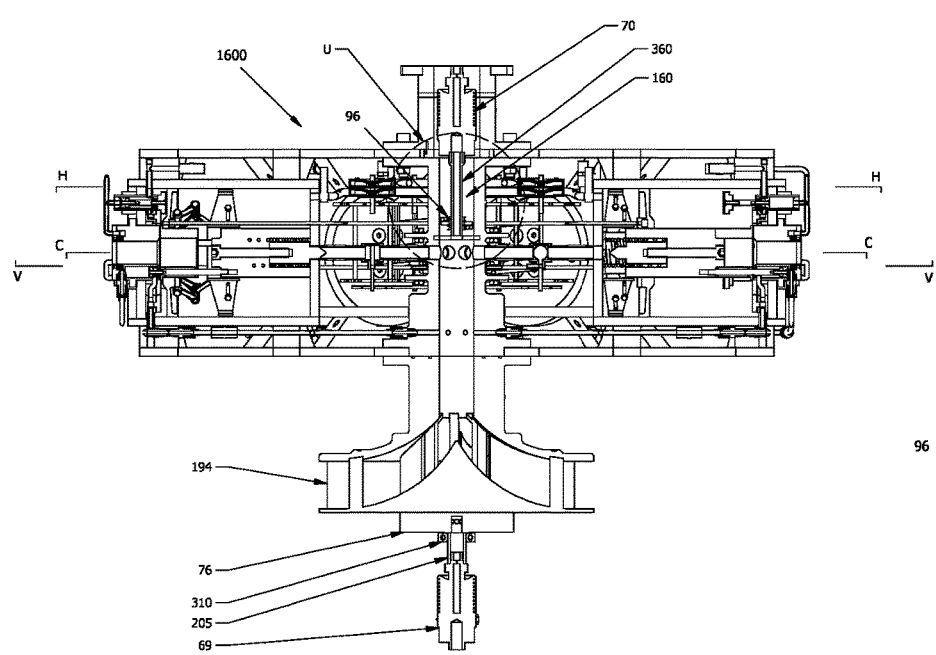
FIG. 11 is a cross-sectional view of the rotational assembly of FIG. 10 taken along line A-A.
Figure 12:
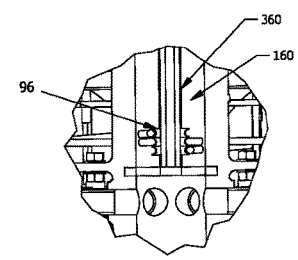
FIG. 12 is a sectional view of the circle U of FIG. 11.
Figure 13:
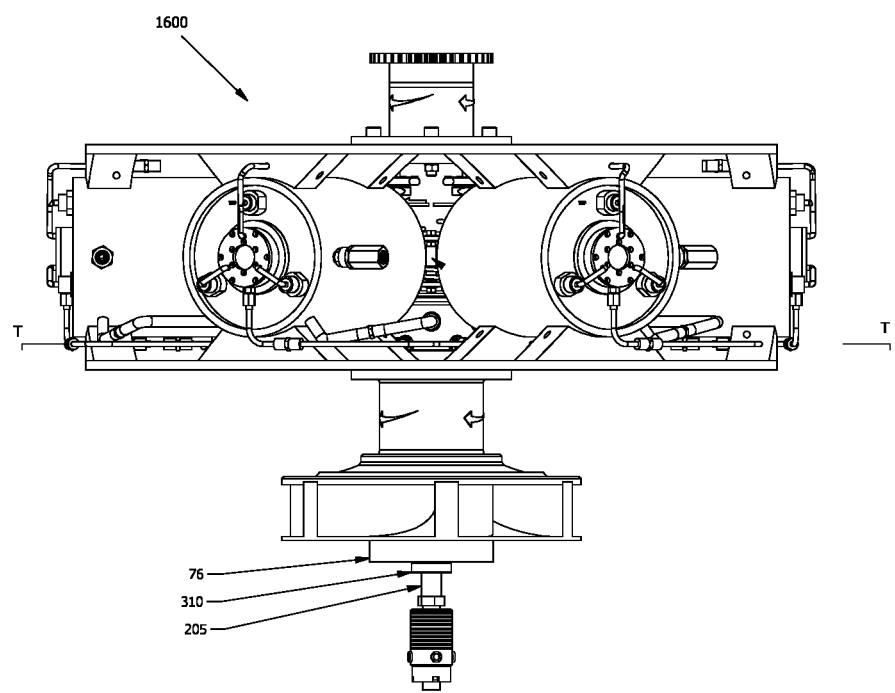
FIG. 13 is a side view of the rotational assembly of FIG. 9.
Figure 14:
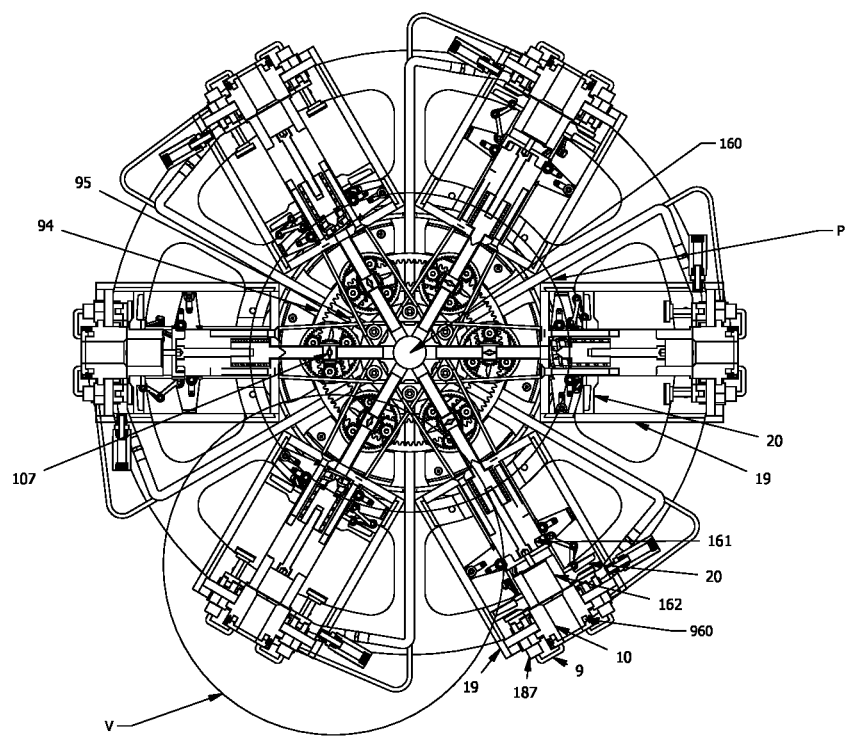
FIG. 14 is a cross-sectional view of the rotational assembly of FIG. 11 taken along line C-C.

The rotational source 71 may be for example, a motor. The motor may be any mechanism driven by an external force including for example, wind or solar power. The rotational source 71 is coupled to a rotational assembly 1600. The rotational assembly 1600 may be supported by a roller frame 67 and rollers 68. Details of the rotational assembly 1600 are shown for example in FIG. 11. In an illustrative embodiment, the rotational assembly 1600 includes an impeller type pump 194. As will be seen further below, the rotational assembly 1600 may include the compression elements driven by the incompressible fluid and rotation of the rotation assembly to compress a gas. The rotational assembly 1600 includes a central conduit or shaft 160. The central conduit 160 may extend beneath the fill line of the tank(s) 88. An ideal water level in tank 88 may be somewhere above an impeller pump 194 and below roller frame 67. The walls of the tank 88 may extend higher than roller frame 67 so that when water is ejected from compression chamber(s) 19, the tank 88 walls can capture the non-compressible liquid and let it flow to the lower part of the tank 88.

In one embodiment, a many to one manifold 76 (FIG. 11) may connect to the impeller type pump 194. The many to one manifold 76 directly below impeller pump 194 may connect to rotating pipe 205, which connects to rotary union 69, which connects to another many to one manifold 800, which connects to supply conduit(s) 25, which connect to compressible fluid tanks 79. Bearing 310 holds the rotating pipe 205 in place. Bearing 310 may be a sealed bearing so that the contents of tank 88 do not leak. The illustrative embodiment shows a six to one manifold however, it will be understood that the number of conduits 25 (which may be used to route compressed air/gas) and manifold openings may be based on the number of tanks 79 used.

Figure 42:
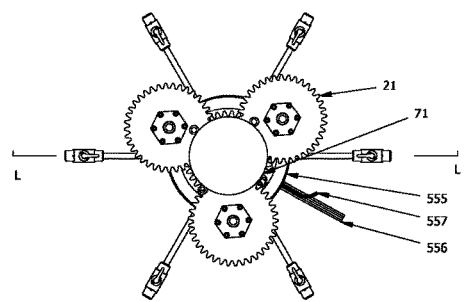
FIG. 42 is a top view of the rotational input source assembly of FIG. 41.
Figure 41:
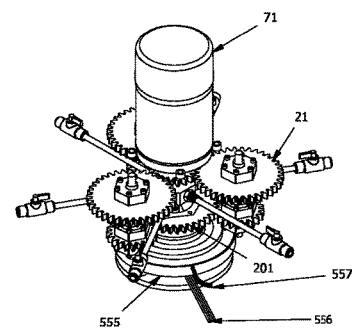
FIG. 41 is an isolated, top, perspective view of a rotational input source assembly of the gas compressor system of FIG. 1 according to an embodiment.
Figure 43:
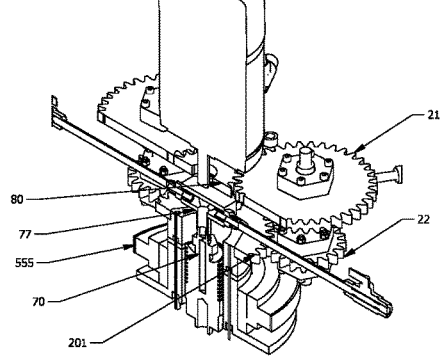
FIG. 43 is a cross-sectional view taken along line L-L in FIG. 42.
Figure 46:
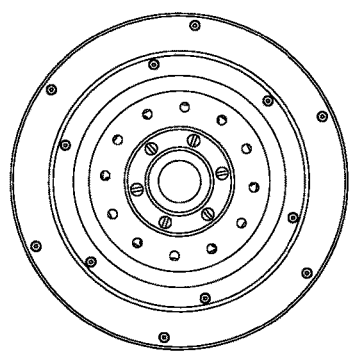
FIG. 46 is a top view of the air impeller pump of FIG. 44.
Figure 45:
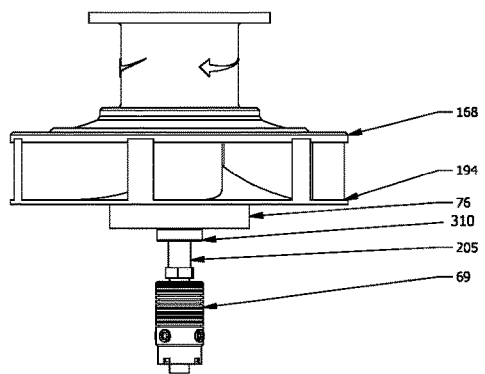
FIG. 45 is a side view of the air impeller pump of FIG. 44.
Figure 44:
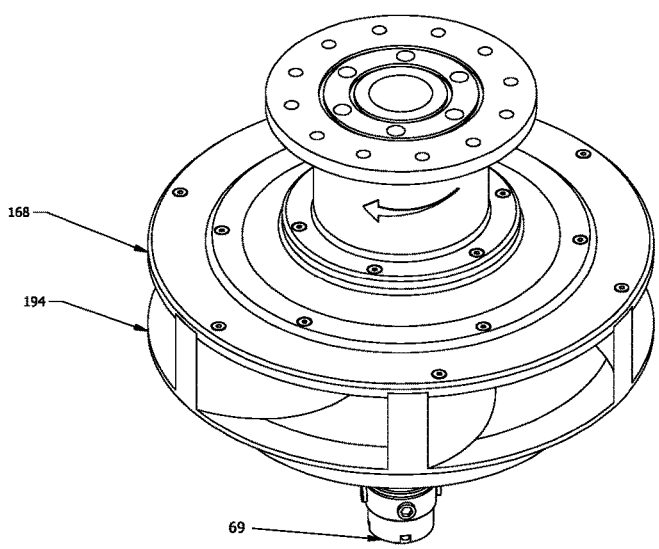
FIG. 44 is an isolated, top, perspective view of an air impeller pump of the system of FIG. 11 according to an embodiment.
Figure 47:
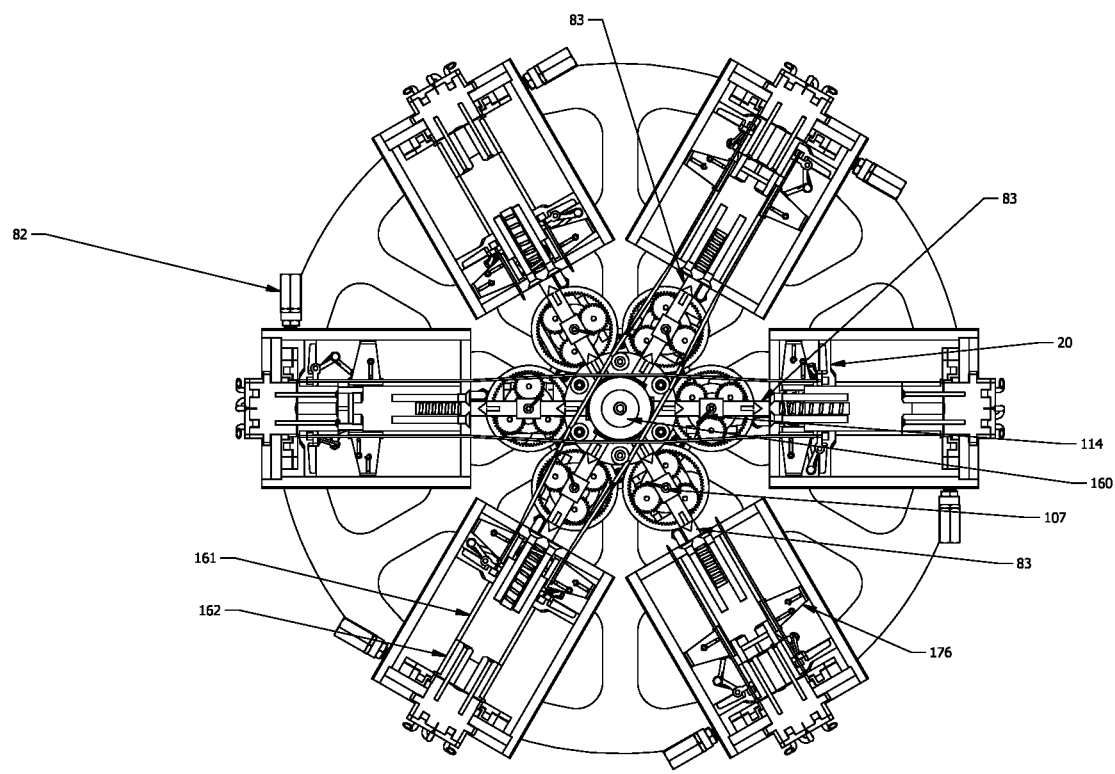
FIG. 47 is a cross-sectional view taken along the line V-V of FIG. 11.
Figure 48:
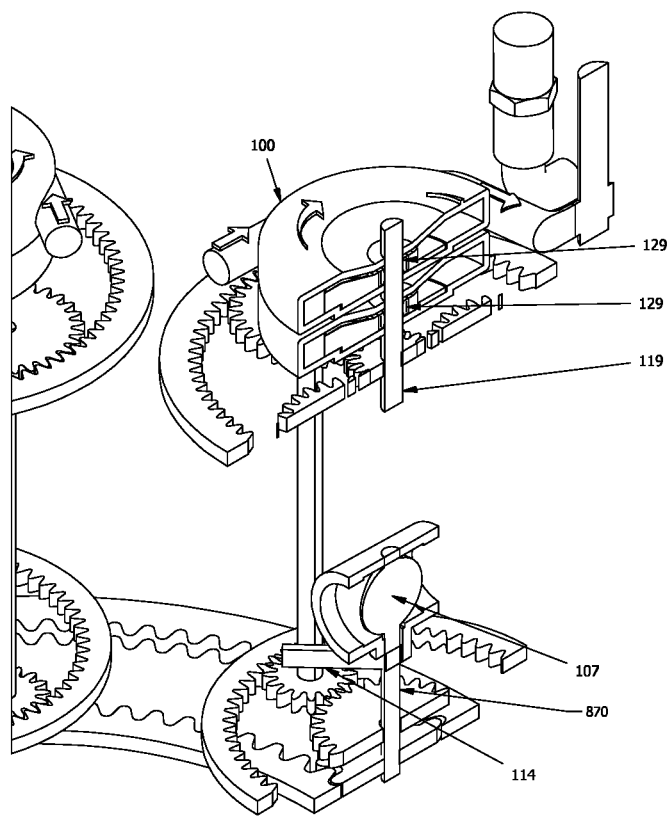
FIG. 48 is a cross-sectional view taken along the line Z-Z of FIG. 34.

In general, the rotational source 71 turns the rotational assembly 1600. The incompressible fluid in tank(s) 88 is drawn into the impeller type pump 194. In operation, the impeller pump 194 turns as it is submerged in water/non-compressible liquid in tank 88. The impeller blades of impeller pump 194 are angled to scoop water/non compressible liquid inward. The impeller pump 194 may include a ramp that directs water/non compressible liquid upward along central conduit 160. In some embodiments, the impeller pump 194 may include a cap 168 (See FIGS. 44 and 45) to help increase the pressure on the liquid flow in conduit 160. While not illustrated as such, in some embodiments, the impeller pump 194 may be enclosed to increase fluid pressure inside conduit 160. As will be appreciated, the central conduit 160 may have multiple functions. The rotation of the central conduit 160 further draws the incompressible fluid up the system. As will be explained in additional detail below, the incompressible fluid is fed into a pressure chamber 19 to provide the force to compress the compressible fluid. In addition, the rotation from the rotation assembly may be used as a contributing source of centripetal force to drive a piston system in the pressure chamber 19. Compressed fluid (for example, pressurized gas) may be released for whatever desired application through output source ports 12. The incompressible fluid, when done being used to compress the gas during a cycle, may be routed back to the storage tank 88 (See for example, FIGS. 51 and 52) for re-use in a subsequent compression cycle. In some embodiments, the rotational source may be connected to reduction gears to increase torque as shown in FIGS. 41-43. The reduction gears may include for example, an upper sun gear 80, a lower sun gear 201, an upper planet gear 21 and a lower planet gear 22.

Figure 15:
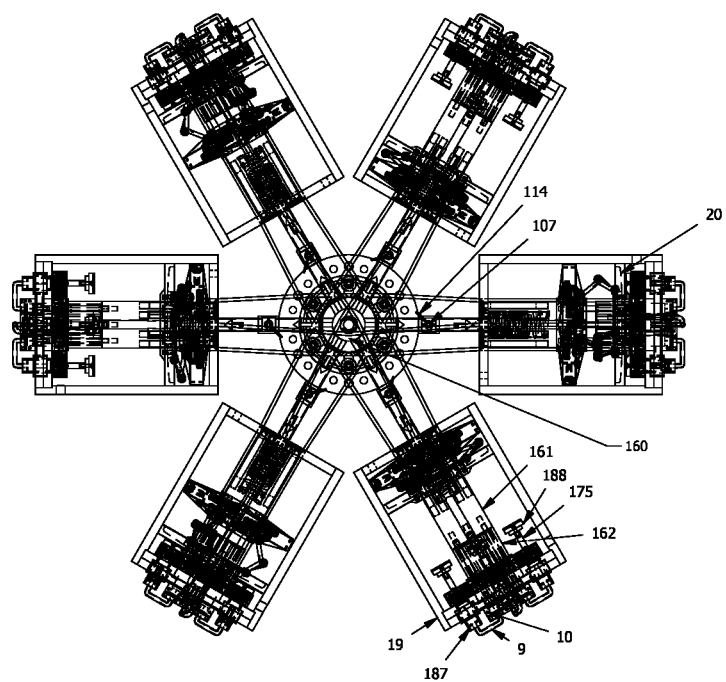
FIG. 15 is an isolated, top, internal view of a piston system in the rotational assembly of FIG. 11 according to an embodiment.
Figure 16:
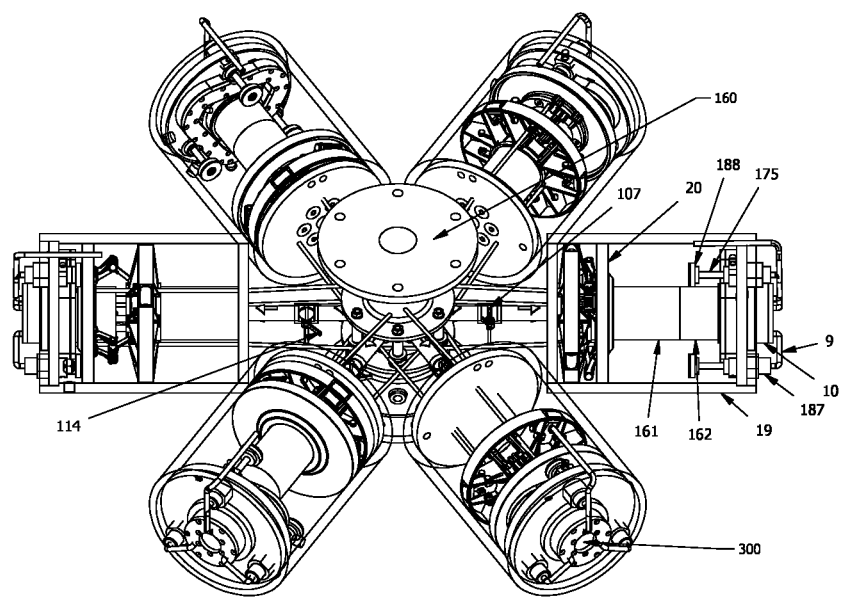
FIG. 16 is a top, perspective view of the piston system of FIG. 15.
Figure 52:
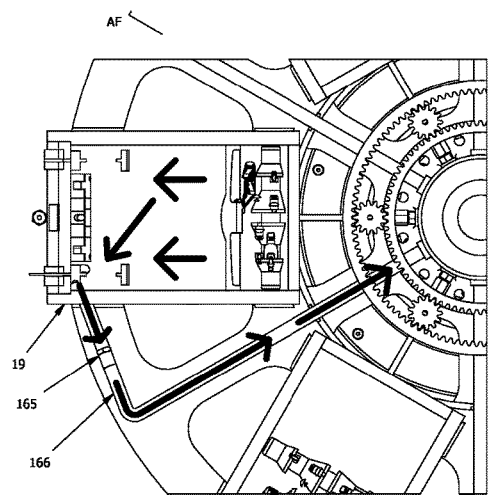
FIG. 52 is an enlarged view of the circle V from FIG. 14 illustrating a flow protocol for compressible gas according to an illustrative embodiment.
Figure 51:
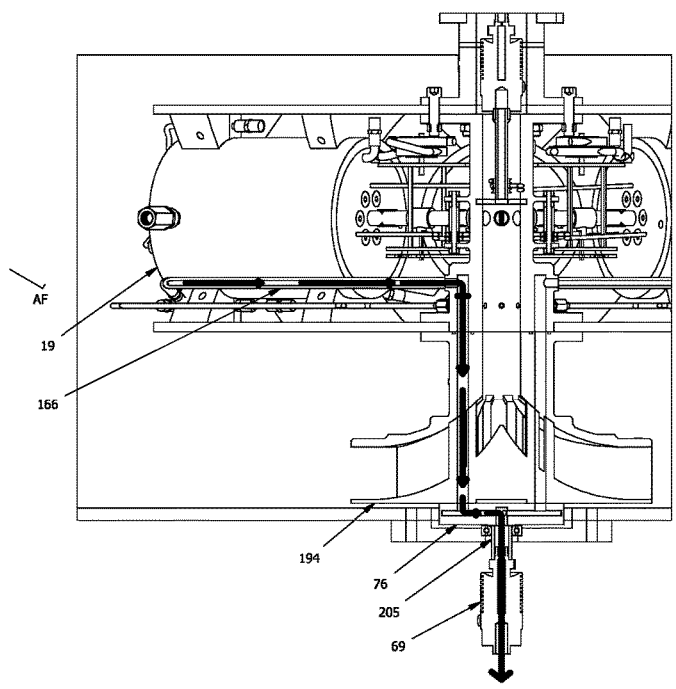
FIG. 51 is a cross-sectional view taken along the line AF-AF of FIG. 52 illustrating a flow protocol for compressible gas according to an illustrative embodiment.

Referring now to FIGS. 9-14, the rotational assembly 1600 is shown according to an illustrative embodiment. The rotational assembly 1600 is a module of elements that when operated, generates centripetal forces by its rotation. The rotational assembly 1600 may include a frame holding the compression elements while the assembly is spun by the rotational source 71. The centripetal forces are harnessed to drive the compression elements. For example, the rotational assembly 1600 may include at least one set of pistons housed within respective compression chambers 19. In an illustrative embodiment, the sets of pistons may be arranged in pairs laying on the same plane or perpendicular to the axis of rotation of the central conduit 160. Details of the piston arrangement and operation is discussed further below in FIGS. 14-16. Generally speaking, as the rotational assembly 1600 is spun, a piston is driven outward by the centripetal force generated by the rotational assembly 1600. Prior to the piston being driven outward the incompressible fluid is provided through supply lines 83 into pressure chamber 19. The incompressible fluid entering the chamber 19 generates pressure. As pressure from the inboard side builds, air is allowed to escape from the pressure chamber 19 via air release valve 120. As the incompressible fluid continues to fill the pressure chamber 19, centripetal forces upon piston wall 20 will increase. In addition, the introduction of incompressible fluid will increase the force of mass against the piston wall 20. The pumping action of impeller pump 194 will also increase the pressure on piston wall 20. This pressure will eventually exceed the pressure on the extended piston wall 20 of the opposite/coupled pressure chamber 19. At this point the piston wall 20 will start to move outboard into the extended position. As the reciprocal piston wall 20 of the opposite/coupled pressure chamber 19 is pulled back to the start position via cables 105 and 5, air can escape the inboard side of said pressure chamber 19 via air release valve 120. After air is allowed to escape air release valve 120 it is released out of the system. Compressed gas may escape pressure chamber 19 through conduits 166 as depicted in FIGS. 51 and 52. Check valves 165 in the conduits 166 prevent backflow of compressed gas into pressure chamber 19. The compressed gas may be routed outside of the rotational assembly 1600 along a bottom rotary union 69 into storage tanks 79. Once compressed gas is released, the incompressible fluid may be released from the pressure chamber 19. A vacuum is created when the incompressible fluid rapidly exists pressure chamber 19 via conduit 300. The incompressible fluid may stored/recycled in tank 88. In some embodiments, the system may include a second rotary union 70 on the top end of the rotational assembly 1600. The rotary unions 69 and 70 are fittings that allow compressed gas or liquid to travel along a shaft where part of the shaft is stationary, and the other part of the shaft is rotating. A single rotary union fitting may have multiple conduits. In some embodiments, either rotary union may be paired with a slip ring 555. (See for example, FIGS. 41 and 43. The slip ring 555 may house stationary wires 557 and rotating wires are 556 to allow for electrical current to flow along the same shaft as fluid. The slip ring 555 may be included to connect electrical elements including monitoring sensors and controlling actuators, as needed within the rotating assembly.

Referring now to FIGS. 9-16, compression chambers 19 are shown according to an illustrative embodiment. As mentioned previously, sets of compression chambers 19 may be arranged in pairs. In the illustrative embodiment shown, six compression chambers 19 are arranged on the same plane. The compression chambers 19 of a set may be positioned on a same line, end to end, that extends from one end of the diameter of the rotation assembly frame to the opposite side of the same diametric line. For each set of chambers 19, the outboard ends of the chambers point outward/away from the central conduit 160 on the same radial axis. The pistons for each pair of compression chambers may be positioned to actuate away from each other on opposite sides of the arrangement so that the outboard end of one compression chamber 19 in a set points diametrically opposite the outboard end of the other compression chamber 19 in the set.

In some embodiments, the pistons in a set are controlled to actuate in reciprocation. As a first one of the pistons in a set moves outward, the opposing piston retracts within its compression chamber 19. Referring now to FIGS. 17-48, details of piston actuation are disclosed according to illustrative embodiments. In some embodiments, valve control is used to control which pistons are actuated into a compression movement while other pistons are retracted. For example, butterfly valves 107 (See for example, FIG. 48 and FIGS. 57-60) may be controlled so that half the valves are opened while the other half are closed. The butterfly valves 107 may be connected to weighted actuators 114. Centripetal forces may move the weighted actuators 114 to keep the butterfly valves 107 fully closed or open.

Some embodiments may include a timing gear assembly. (See FIGS. 35-37). The timing gear assembly may be configured to close half of the butterfly valves 107 while simultaneously opening the other half of valves. The timing gear assembly may include for example, a timing planet gear 93, coupled to a timing gear ring 94, and coupled to a timing sun gear 95. The timing gear assembly may change butterfly valves 107 from off positions to on positions and vice versa. See for examples, FIGS. 59 and 60 for illustrative valve positions.

Fluid and Gas Flow

The non-compressible fluid (for example, be water or any convenient source of incompressible liquid) enters the inboard side of the compression chamber 19 and is forced against the piston wall 20 (See FIGS. 21-23 and 55-56) by the action of the impeller pump 194 and also due to the weight of the fluid caused by centripetal forces from the rotation of the rotation assembly. These forces will begin to force the piston wall 20 outboard (for example, outward away from the central conduit 160), compressing the gas on the outboard side of the piston wall 20 as depicted for example in FIGS. 51-52. The gas may be for example, ambient air or any convenient source of compressible gas.

The incompressible fluid on the inboard side of the piston wall 20 may be released from the compression chamber 19 by a hydraulic actuator assembly 990 (See for example, FIGS. 18-23). As the piston wall 20 travels outboard, the piston wall 20 impacts a hydraulic actuator head 188, which causes a series of evens to release water via a fluid release conduit 300, which is in the middle of manifold 10 (See FIGS. 16, 53, 54, 56, 70, 71). The hydraulic actuator head 188 may be connected via fluid communication to a central valve head 161 as shown for example, in FIGS. 18-23 and 53-56. As the piston wall 20 impacts the hydraulic actuator head 188, an exterior hydraulic actuator 175 travels down the hydraulic actuator cylinder 187 forcing the incompressible fluid (which at this stage may be used as hydraulic fluid) via the outboard hydraulic conduit 9. Hydraulic manifolds may be used to help the actuators 198 and 175 (See FIGS. 53-56) work as one system. For example, an outboard hydraulic manifold 10 and an inboard hydraulic manifold 196 cooperate as intermediate units between the actuators. As hydraulic fluid enters the outboard hydraulic manifold 10, the hydraulic pressure may be evenly dispersed to multiple interior hydraulic actuators 198. These interior hydraulic actuators 198 may in turn open the central valve head 161 secured against a central valve seat 162. The connection 920 (See FIG. 18) between the central valve head 161 and central valve seat 162 may have on or more O-rings (not depicted for sake of illustration). Once the hydraulic actuator 198 has opened, the central valve head 161, creates an opening 400, leading to conduit 300 so the fluid can escape pressure chamber 19 and go back into tank 88 where it will be recycled. The incompressible fluid inboard of the piston wall 20 may be released via a fluid release conduit 300.

In the above description, while the incompressible fluid was also used to drive the actuators, it will be understood that in some embodiments, the actuator system that releases fluid from pressure chamber 19 may run on traditional hydraulic fluid/oil and that fluid can be isolated/separate from the rest of the system meaning the system would be running on more than one type of fluid.

Figure 40:
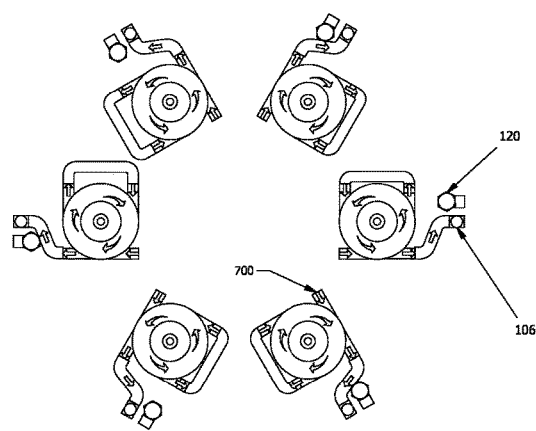
FIG. 40 is a top view of the fan actuator assembly of FIG. 38.
Figure 39:
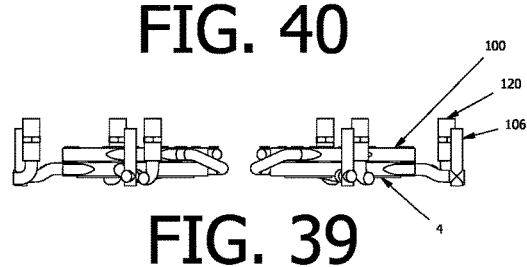
FIG. 39 is a side view of the fan actuator assembly of FIG. 38.
Figure 38:
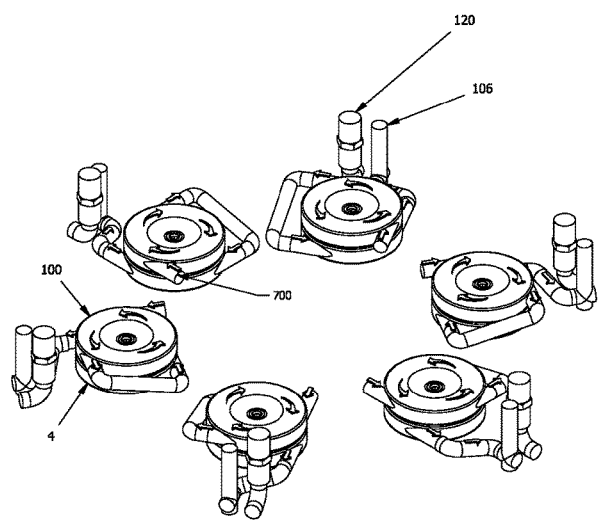
FIG. 38 is an isolated, top, perspective view of a fan actuator assembly of the inboard actuator assembly of FIG. 33 according to an embodiment.

As the incompressible fluid is released from the compression chamber 19, ambient air may rapidly fill the void behind the released incompressible fluid. The rapid movement of air filling the vacuum actuates the inboard actuator assembly 930 (See FIGS. 33 and 34). Referring to FIGS. 38-40, some embodiments may include fan actuator assemblies coupled to the compression chambers 19. As incompressible fluid quickly leaves pressure chamber 19, the exodus will create a vacuum on the inboard side of piston wall 20 located in chamber 19. As the ambient air fills the vacuum, the air travels through fan port 700, turning the fans 109. The turning of fans 109 turn the sun gear 104 which connects to the timing gear assembly 980. The butterfly valves 107 coupled to the gears have their position changed as the valves change from the turning of the fans. The compression chamber 19 may include a gas release valve 120 that, when opened, allows the gas to escape the inboard side of the compression chamber 19 while incompressible fluid flows in. The air release valve 120 may allow the flow of gas to escape while keeping the incompressible fluid in. The incompressible fluid is allowed to exit the pressure chamber 19 via opening 400, which leads to conduit 300, and may be captured thereafter by tank 88.

Figure 49:
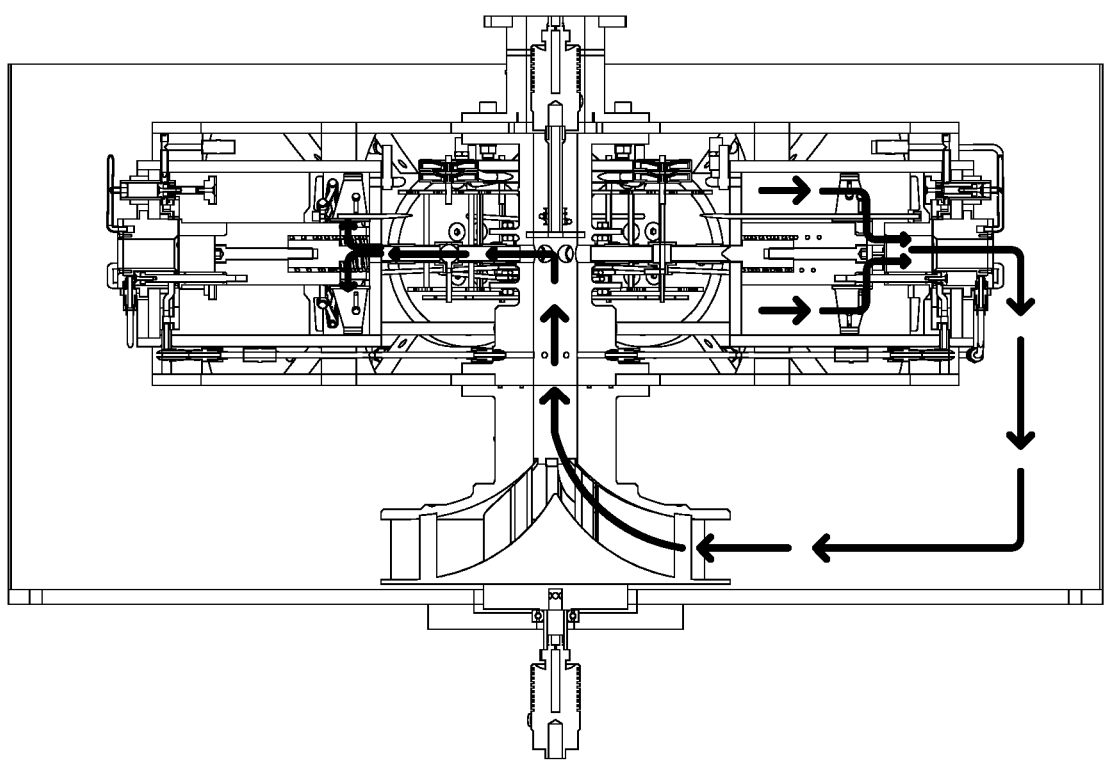
FIG. 49 is a cross-sectional view taken along the line AC-AC of the rotation assembly of FIG. 10 illustrating a flow protocol of incompressible fluid according to an illustrative embodiment.
Figure 50:
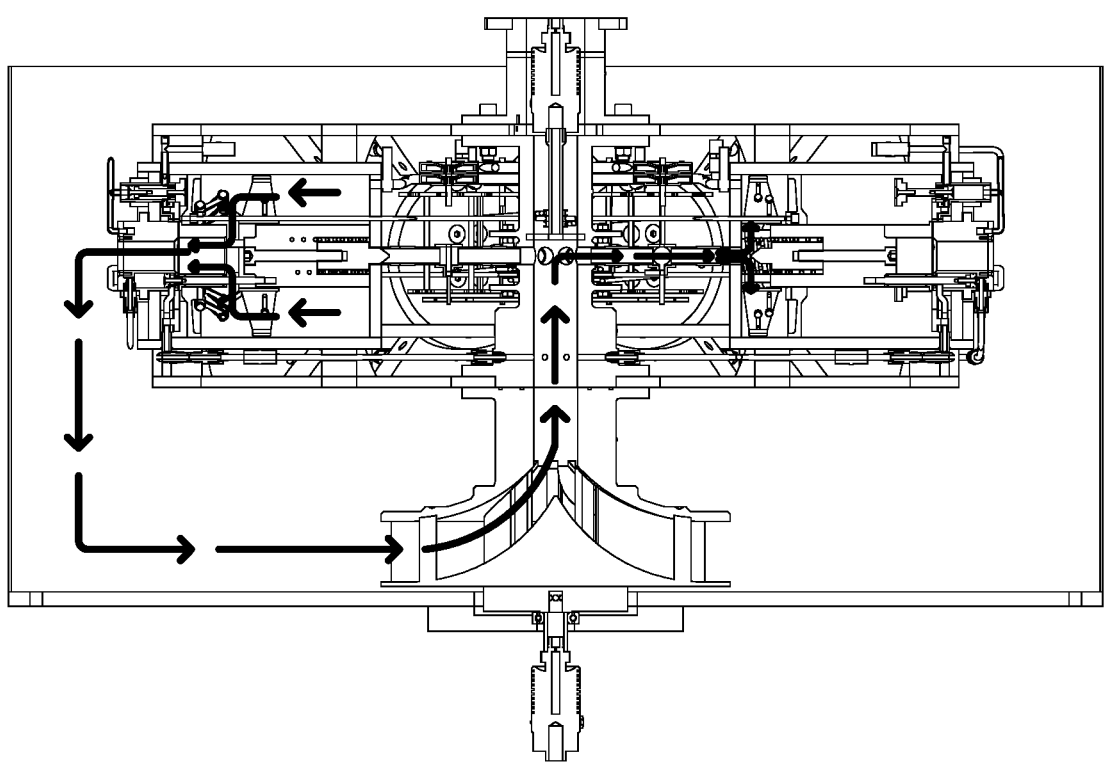
FIG. 50 is a cross-sectional view taken along the line AC-AC of the rotation assembly of FIG. 10 illustrating a flow protocol of incompressible fluid according to another illustrative embodiment.

The incompressible fluid expelled may be recaptured in a tank 88 (See FIG. 1) so that the fluid may be reused to compress gas in the system as depicted for example, in FIGS. 49 and 50. As shown, illustrative embodiments for incompressible fluid flow may include two different protocols. In FIG. 49, the pressure chamber 19 on the right side is releasing incompressible fluid while the pressure chamber on the opposite side of the system side is receiving incompressible fluid and pressurizing the compressible fluid. FIG. 50 shows the incompressible fluid flow switched as the pressure chamber on the left side is now releasing incompressible fluid after pressurizing the compressible fluid. The incompressible fluid may circulate into the opposing pressure chamber where the process to pressurize the compressible fluid begins. As may be known, compression of gas may cause some fluid condensation. The fluid condensation may be delivered to the storage tanks 79 via rotary union 69, to manifold 800 just below, then via conduit(s) 25, into tank(s) 79. This may be the same route for the compressed gas/air. This fluid condensation can be recycled in the system via a float type valve (not depicted) and released back into the tank 88.

Piston Actuation

Referring back to the actuation of mechanical elements, details of piston operation are described herein according to illustrative embodiments. Referring to FIGS. 18-29, a central valve head 161 may be supported by a folding spring assembly 970. When the central valve head 161 opens creating passage 400, leading to conduit 300, it may sag very slightly due to gravity. Since sag may be undesirable, inside rollers 177 on folding spring assembly are there to provide support. The folding spring assembly may stabilize the central valve head when in the open position. The folding spring assembly may include a torsion spring 98, folding spring arms 127 (double arms) and 130 (single arm), and a folding spring frame 176. Rollers 178 may be attached to spring frame 176. Roller(s) 178 allow the folding spring assembly to smoothly move inside of pressure chamber 19. The torsion spring 98 creates outward pressure against arms 127 and 130 to keep the folding spring assembly extended while they are moving away from the inboard side of pressure chamber 19. When the piston wall 20 is in the retracted position, the folding spring assembly may fold to allow for piston wall function. The folding spring assembly may be attached to the piston wall 20 by a piston wall anchor ring 151.

As the butterfly valve(s) 107 are alternately opened/closed by the flow of ambient air filling the void in pressure chambers 19, the inflow of air may be routed through the actuating fan 109 inside actuating fan casing(s) 100 attached to an actuator shaft 119. The actuator shaft 119 may be mechanically connected to the upper planetary actuator gear assembly of the timing gear assembly (shown in FIG. 35), comprising the upper actuating planet gear 102, the upper actuating ring gear 103, and the upper actuating sun gear 104. The rotational energy from the upper actuator gear assembly may then be transferred to a lower actuating planetary gear assembly by way of a connecting shaft 170. The lower actuator planetary gears may comprise the lower actuating planet gear 23, the lower actuating ring gear 66, and the lower actuating sun gear 81. The lower actuating sun gear 81 may be connected to both the valve actuator shaft 870 and the timing gear assembly. The valve actuator shaft 870 may connect a butterfly valve 107 to the actuator system 980.

Referring to FIGS. 33-34 and 38-40, additional torque may be added to the inboard actuator assembly 930 by routing the flow of air through multiple actuating fans. Torque can further be increased by changing the gear ratio between the upper actuator gear assembly (gears 102, 103, and 104 in relation to the lower actuator gear assembly (gears 81, 23, and 66).

Figure 31:
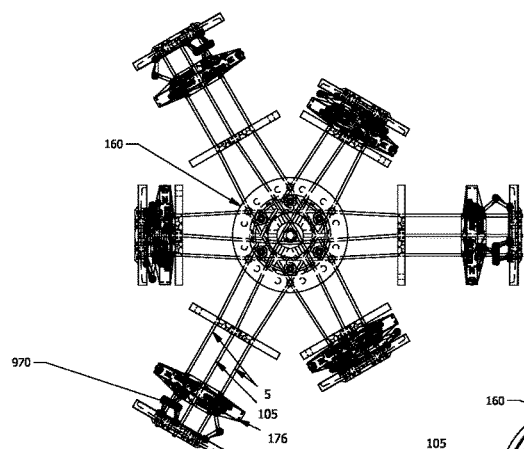
FIG. 31 is a top view of the piston system of FIG. 30 illustrating the pistons in a first position according to an alternating protocol in an illustrative embodiment.
Figure 32:
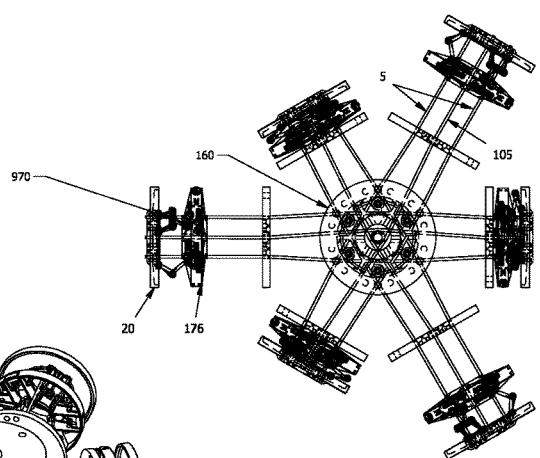
FIG. 32 depicts the piston system of FIG. 31 in a second position according to the alternating protocol.
Figure 30:
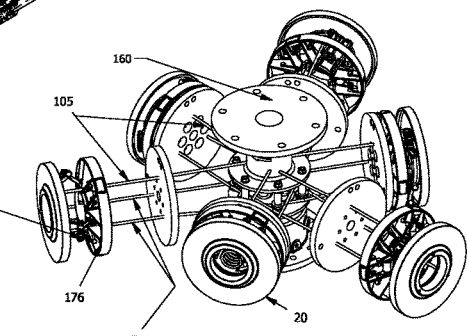
FIG. 30 is an isolated, top, perspective view of a piston system according to an embodiment.
Figure 57:
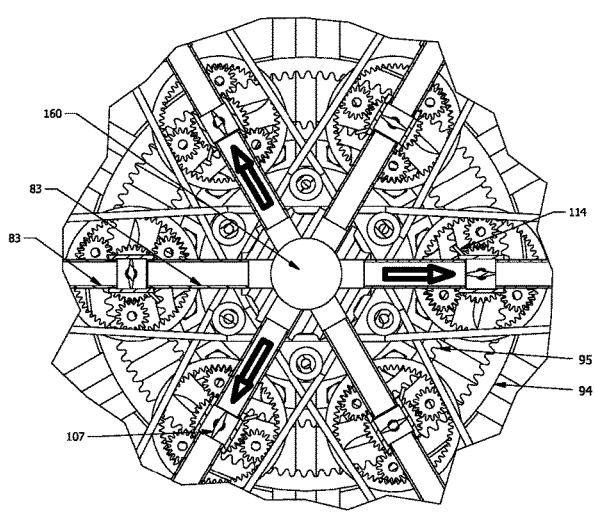
FIG. 57 is an enlarged top view of circle P from FIG. 14 of valves illustrating a first set of valve positions according to an illustrative embodiment.
Figure 58:
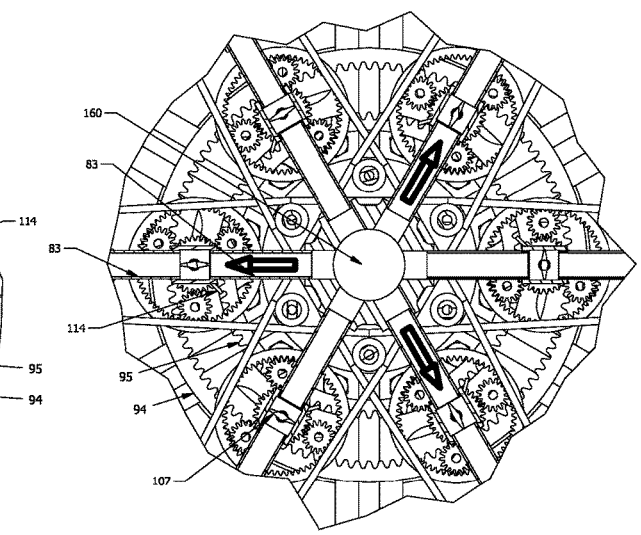
FIG. 58 is a top view of valves illustrating a second set of valve positions according to an illustrative embodiment.
Figure 59:
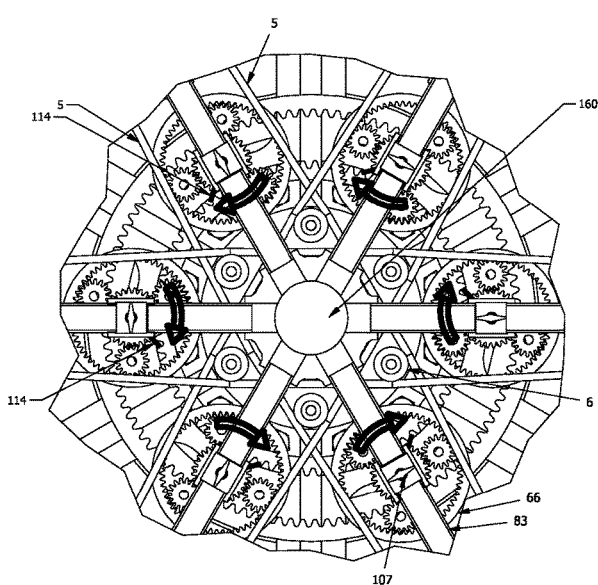
FIG. 59 is a top view of valve system of FIG. 57 illustrating a first direction of valve actuation according to an illustrative embodiment.
Figure 60:
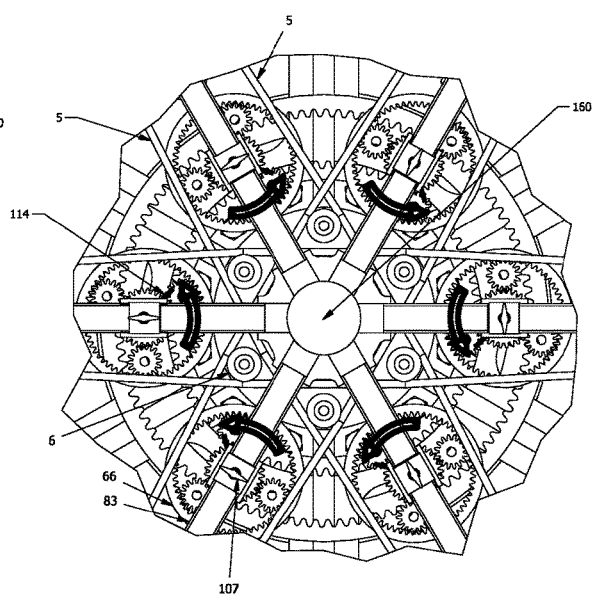
FIG. 60 is a top view of the valve system of FIG. 57 illustrating a second direction of valve actuation according to an illustrative embodiment.
Figure 62:
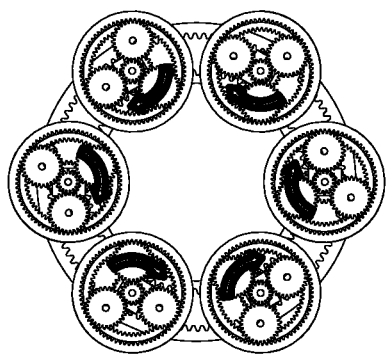
FIG. 62 is a top view of the timing gear assembly of FIG. 61 depicting a direction of actuation correlating to the first direction of valve actuation in FIG. 59 according to an illustrative embodiment.
Figure 64:
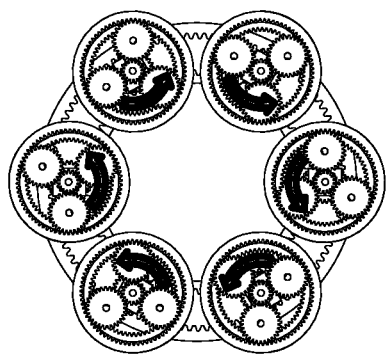
FIG. 64 is a top view of the timing gear assembly of FIG. 61 depicting a direction of actuation correlating to the second direction of valve actuation in FIG. 60 according to an illustrative embodiment.
Figure 61:
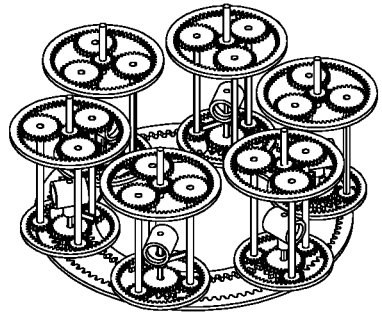
FIG. 61 is a top, perspective view of a timing gear assembly of FIG. 35.
Figure 63:
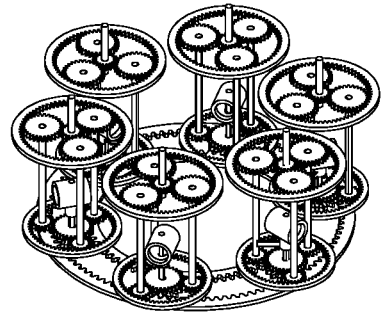
FIG. 63 is a top, perspective view of a timing gear assembly of FIG. 35.
Figure 66:
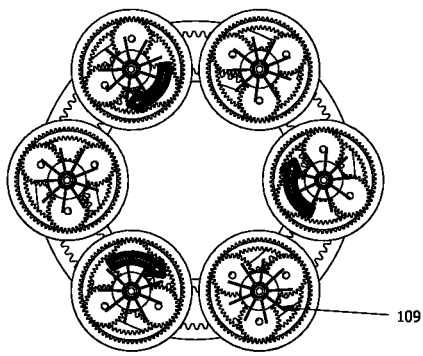
FIG. 66 is a top view of the assembly of FIG. 65 depicting a direction of actuation for the fans correlating to the first direction of valve actuation in FIG. 59 according to an illustrative embodiment.
Figure 68:
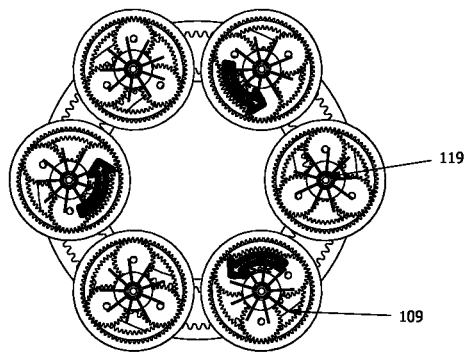
FIG. 68 is a top view of the assembly of FIG. 67 depicting a direction of actuation for the fans correlating to the second direction of valve actuation in FIG. 60 according to an illustrative embodiment.
Figure 65:
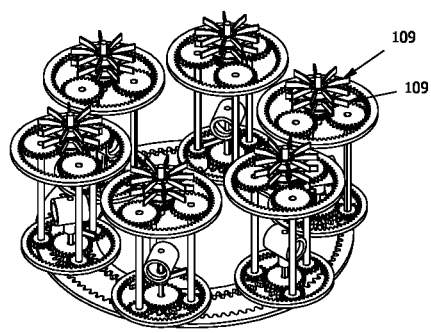
FIG. 65 is a top, perspective view of a partial actuator assembly including fans, valves, and gears according to an embodiment.
Figure 67:
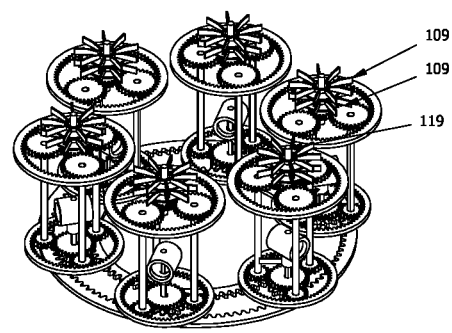
FIG. 67 is a top, perspective view of a partial actuator assembly including fans, valves, and gears according to an embodiment.

In the illustrative embodiment for piston control shown in for example, FIGS. 30-32, the system may be controlled to generate a vacuum in three of the six compression chambers 19. The generation of a vacuum may alternate between adjacent compression chambers 19 so that every other compression chamber 19 is either compressing or retracting the piston wall 20, while the adjacent compression chambers 19 may be in an opposite state of compression/retraction. The air flow in those three compression chambers 19 generating the vacuum may be utilized to change all six butterfly valves. FIGS. 57 and 58 illustrate one of two positions the valves may be positioned in. In order to maintain the proper protocol, the valves may be connected to the timing gear assembly. The butterfly valves 107 may alternate between position A and position B. FIGS. 59 and 60 depict two directions the actuator system may rotate to alternate between position A and B (FIGS. 57 and 58). FIGS. 61-64 depicts the back-and-forth rotation of the timing gear system attached to the butterfly valves of FIGS. 57-60. FIGS. 65-68 depicts the back-and-forth rotation of the actuator fans 109 attached to the timing gear system. As should be noted, only three of six actuator fans rotate in one direction and the alternate three of six fans rotate in the opposite direction. Given the system structure as described, only half of the compression chambers 19 will generate a vacuum at any one given time. For this reason, it may only be necessary for half of the actuator fans to spin to alternate the protocol of the butterfly valves 107. The actuator fans 109 may be connected to the timing gear system via a one way bearing or clutch 129 (FIG. 48) that only engages the actuator shaft 119 in one direction. It is possible that the actuation of the butterfly valves 107 completes prior to the vacuum in the compression chambers 19 being equalized. So that the fans may continue to spin while the vacuum is equalized, the one-way bearing may be used as an overrunning clutch. An overrunning clutch bearing can be a one way bearing which allows fan 109 to continue turning after actuator shaft 119 has stopped. Actuator shaft 119 may stop turning once butterfly valves 107 have fully changed position. The weighted actuator 114 may stop the valve 107 in the correct location (fully open or fully closed) when it butts up against the valve casing.

Figure 34:
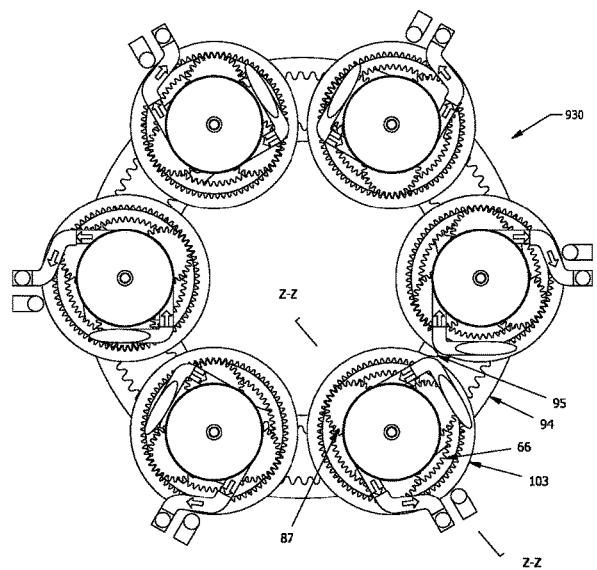
FIG. 34 is a cross-sectional view taken along line H-H in FIG. 11.
Figure 33:
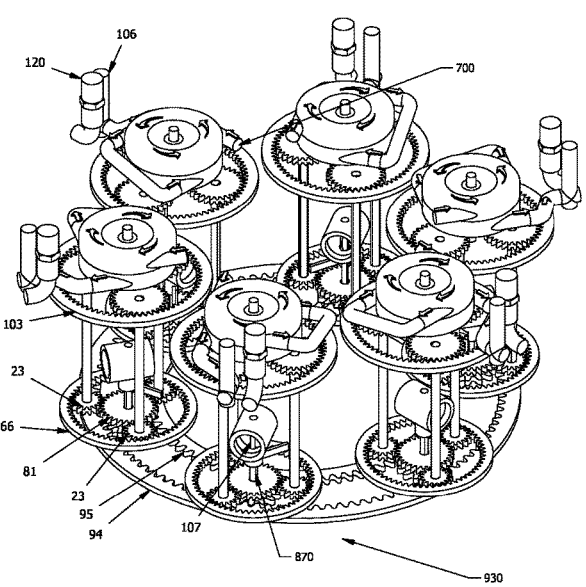
FIG. 33 is an isolated, top, perspective view of an inboard actuator assembly of the rotational assembly of FIG. 11 according to an embodiment.
Figure 37:
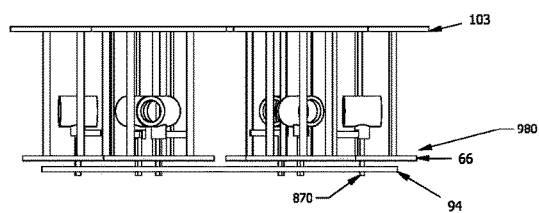
FIG. 37 is a side view of the timing gear assembly of FIG. 35.
Figure 35:
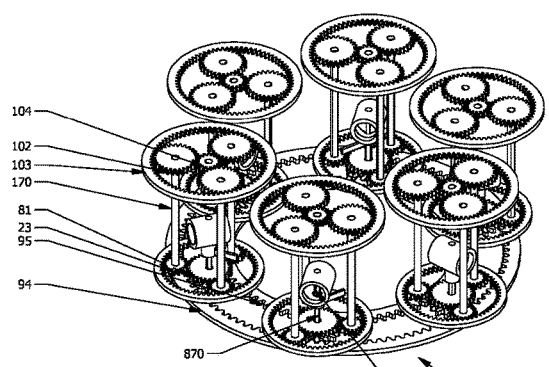
FIG. 35 is an isolated, top, perspective view of a timing gear assembly of the inboard actuator assembly of FIG. 33 according to an embodiment.
Figure 36:
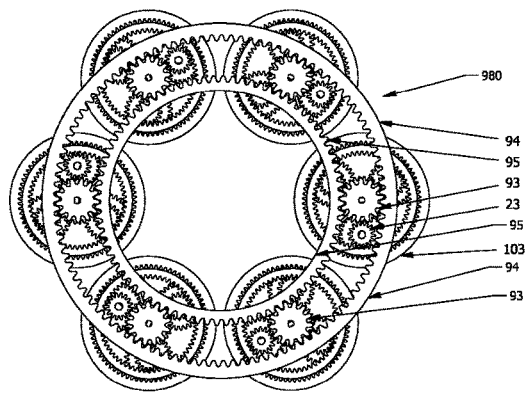
FIG. 36 is a bottom view of the timing gear assembly of FIG. 35.

As incompressible fluid evacuates the compression chambers 19, the incompressible fluid will no longer be on the inboard side of the compression chamber 19 to pressure the piston wall 20 into the outboard position. Centripetal forces will begin to act on the central valve head 161 closing the valve opening 400. The central valve head 161 may act as two valves. When outboard, the central valve head 161 keeps the opening 400 sealed. When inboard, the central valve head 161 keeps supply line(s) 83 sealed. This closing may also be assisted by a central valve spring 164. As the central valve head 161 begins to close the opening 400 as it moves outboard away from conduit 160, the hydraulic pressure will cause the exterior hydraulic actuator(s) 175 back to the starting position. As the central valve head 161 moves outboard away from conduit 160, the central valve head 161 will open shutoff valve 74 (FIG. 19) allowing the flow of fluid to enter via the supply line 83. As the central valve head 161 opens 400 to allow fluid to rapidly escape 19, valve 74 moves inboard towards central conduit 160 to shut off the fluid supply from supply line(s) 83. Shutting off the fluid supply line 83 will discontinue the flow of fluid over the open butterfly valve 107. Stopping the flow over the open butterfly valve 107 will lessen the torque requirement for the inboard actuator assembly 930 (FIGS. 33 and 34). As a result of the actuation protocol just described, the flow of fluid into the compression chambers 19 will have just been expelled. Fluid will cease and the flow of fluid will begin to enter the alternate or opposite compression chamber 19.

Referring now to FIGS. 12, 16, and 30-32, in some embodiments, the system's pistons may also be actuated via belts and pulleys instead of or in conjunction with gears. The piston wall(s) 20 in oppositely positioned compression chambers 19 may be connected together via lower cables 5 and upper cables 105. The lower cables 5 and upper cables 105 may be attached to the piston wall anchor ring 151. The cables 5; 105 may have tensioners (not shown). As the alternate piston wall 20 is extended per the protocol as previously described, the cables 5; 105 will pull the opposite piston wall 20 back to the starting/inboard position. The cables 5; 105 may be coupled to pulleys 96 (See for example, FIG. 12) to reduce friction. Under the configuration described, the pistons will continue to compress gas under an alternating protocol so long as the rotational source 71 continues to operate.

Figure 9:
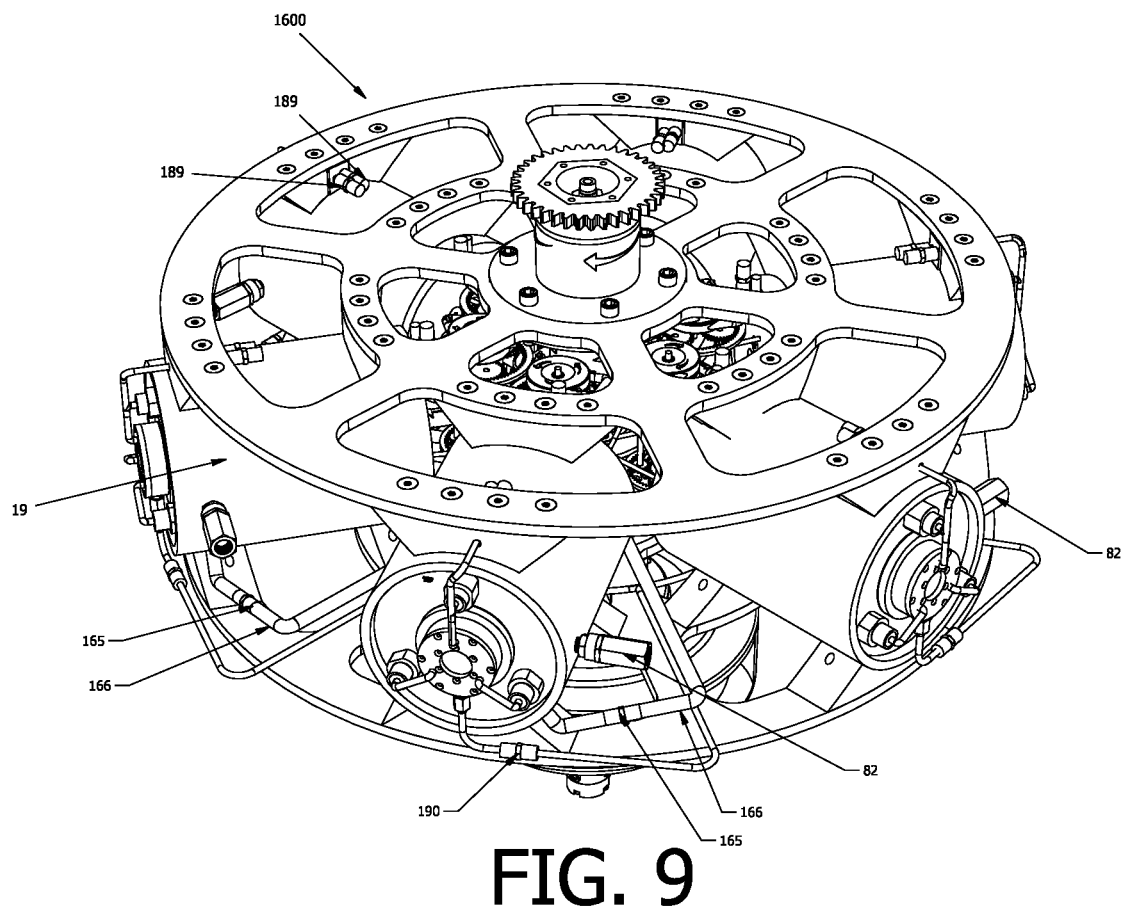
FIG. 9 is a perspective, elevational, view of a rotational assembly in the gas compressor system of FIG. 1 according to an illustrative embodiment.
Figure 10:
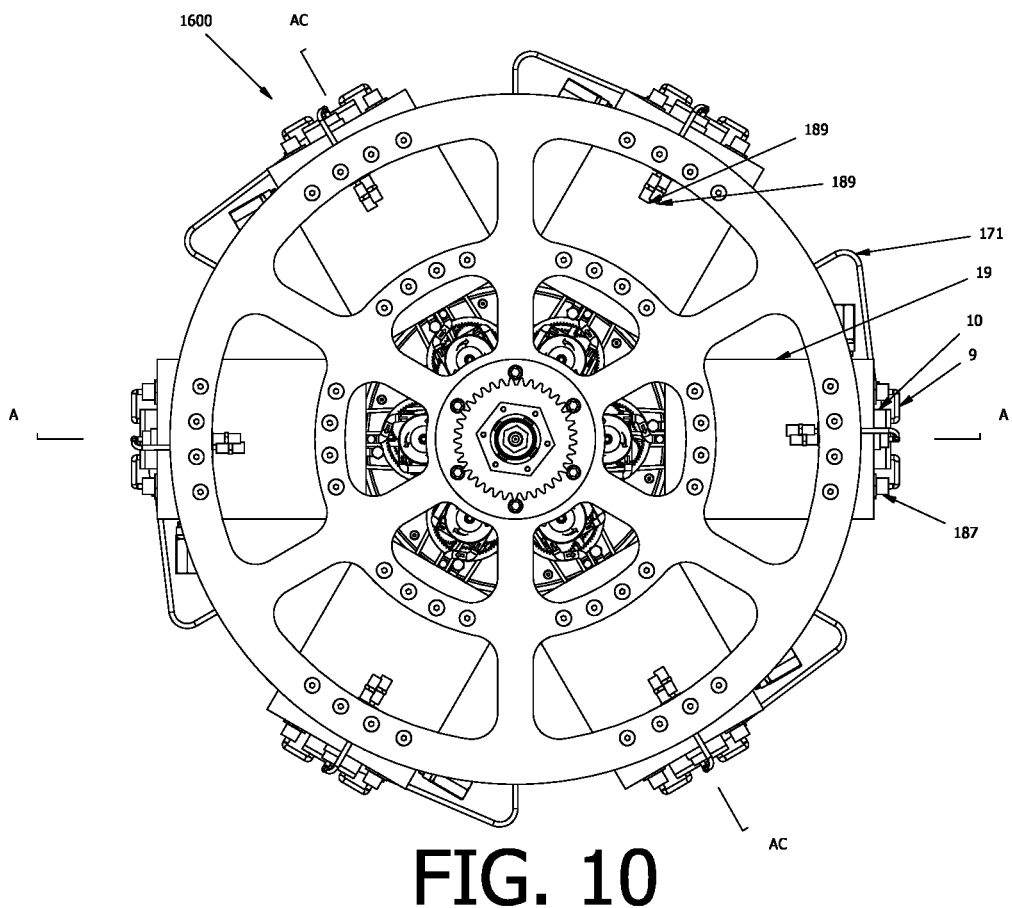
FIG. 10 is a top view of the rotational assembly of FIG. 9.

In some embodiments, ambient air may be compressed and enter the compression chambers 19 via a supply/check valve 82 (See FIG. 9). However, a compressible gas, other than ambient air, can also be routed via a system of conduit(s) and rotary unions 69; 70). In FIGS. 41-43, some embodiments include a slip ring 555 for electrical wiring. The wires 557 on the slip ring 555 can remain stationary while wires 556 can rotate with the rotational assembly 1600. The slip ring 555 allows the circuit(s) to stay intact during rotation.

Figure 17:
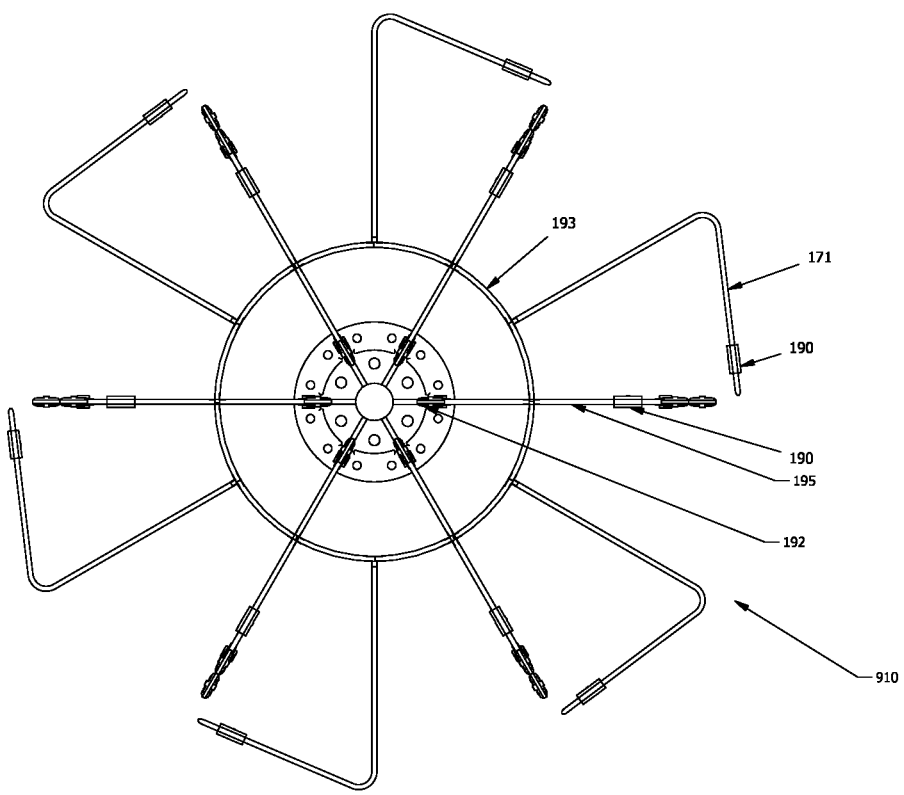
FIG. 17 is a cross-sectional view of a hydraulic assembly of FIG. 13 taken along line T-T.
Figure 20:
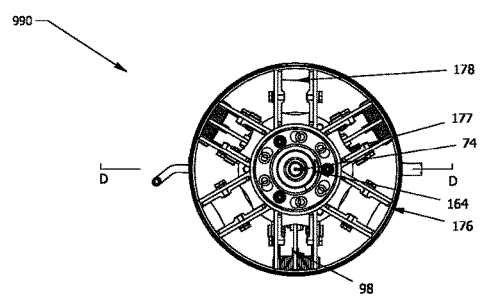
FIG. 20 is a top view of the piston assembly of FIG. 18.
Figure 19:
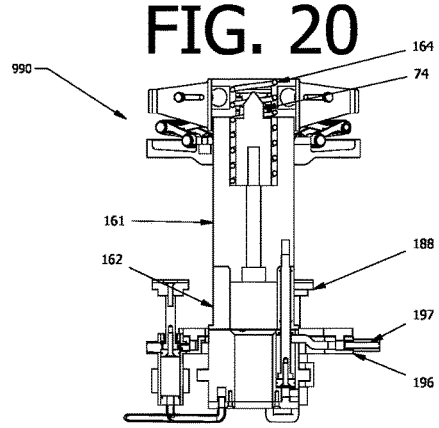
FIG. 19 is a cross-sectional view taken along line D-D in FIG. 20.
Figure 18:
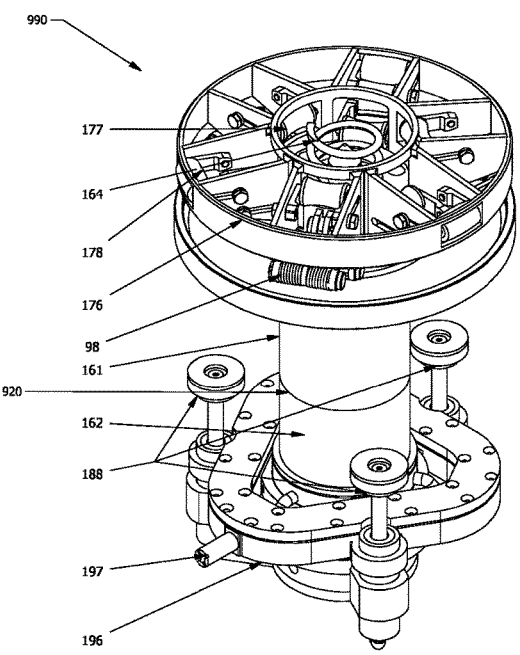
FIG. 18 is an isolated, top, internal view of a piston assembly in the rotational assembly of FIG. 11 according to an embodiment.
Figure 23:
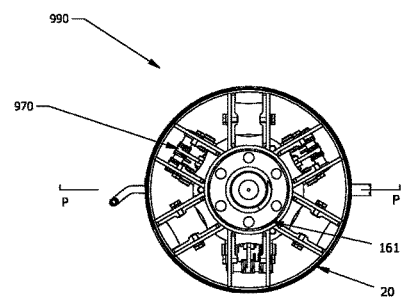
FIG. 23 is a top view of the central valve head of FIG. 21.
Figure 22:
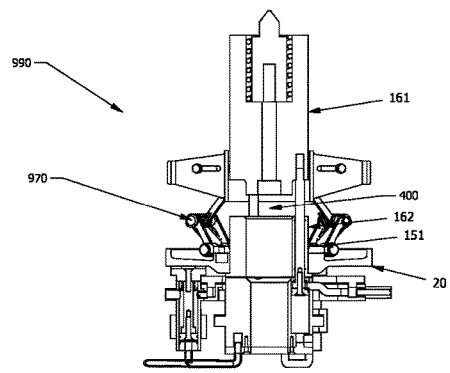
FIG. 22 is a cross-sectional view taken along line P-P in FIG. 23.
Figure 21:
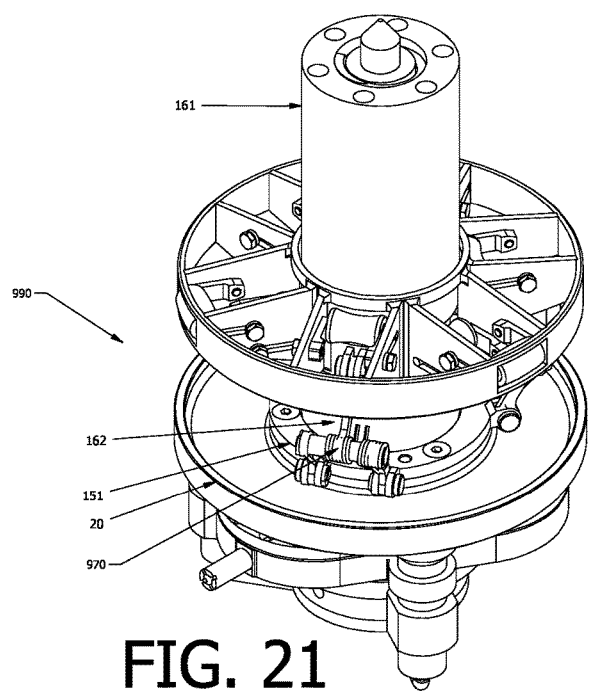
FIG. 21 is an isolated, top, perspective view of a central valve head, in an open state, in the piston assembly of FIG. 18 according to an embodiment.
Figure 26:
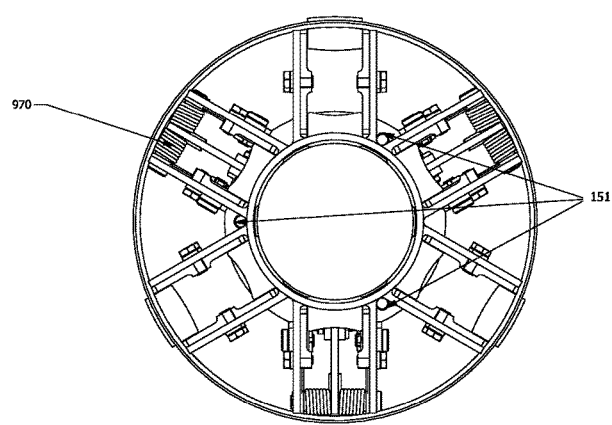
FIG. 26 is a top view of the folded spring assembly of FIG. 24.
Figure 24:
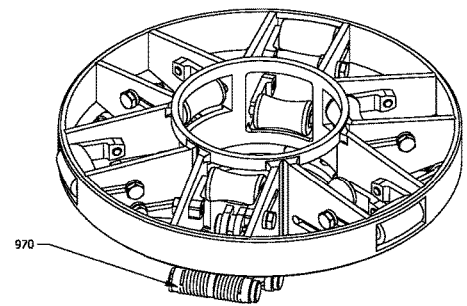
FIG. 24 is an isolated, top, perspective view of a folding spring assembly, in a folded state, in the central valve head, of FIG. 21 according to an embodiment.
Figure 25:
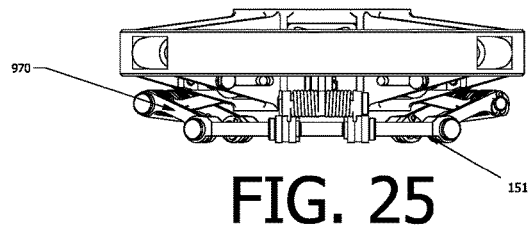
FIG. 25 is a side view of the folded spring assembly of FIG. 24.
Figure 29:
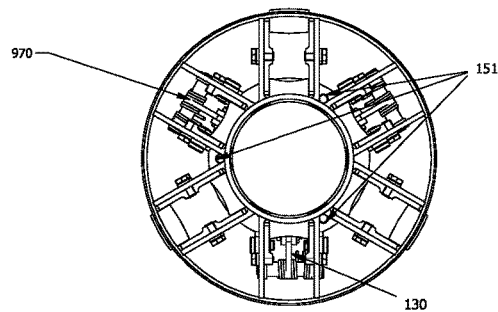
FIG. 29 is a top view of the folded spring assembly of FIG. 27.
Figure 27:
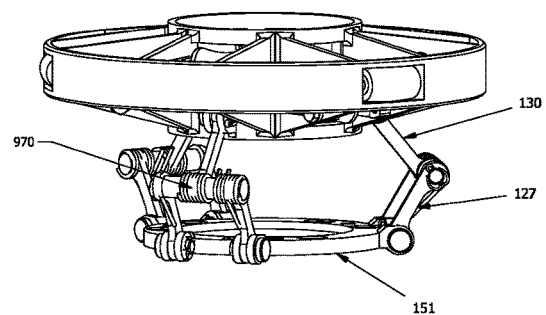
FIG. 27 is a top, perspective view of the folding spring assembly of FIG. 24, in an extended state, according to an embodiment.
Figure 28:
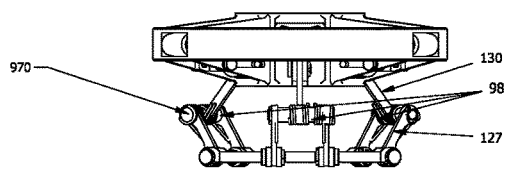
FIG. 28 is a side view of the folded spring assembly of FIG. 27.
Figure 53:
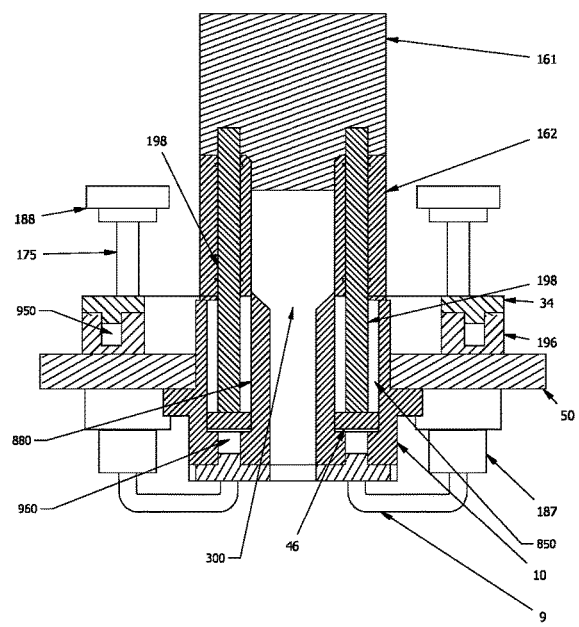
FIG. 53 is a cross-sectional side view of a hydraulic actuator assembly for the in-board side of the system, in an open state, taken along the line Y-Y in FIG. 56, according to an illustrative embodiment.
Figure 54:
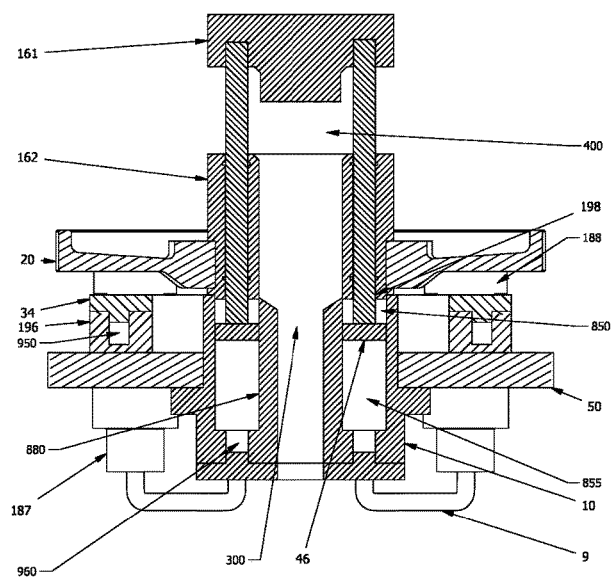
FIG. 54 is a cross-sectional side view of a hydraulic actuator assembly for the in-board side of the system, in a closed state, taken along the line Y-Y in FIG. 56, according to an illustrative embodiment.
Figure 55:
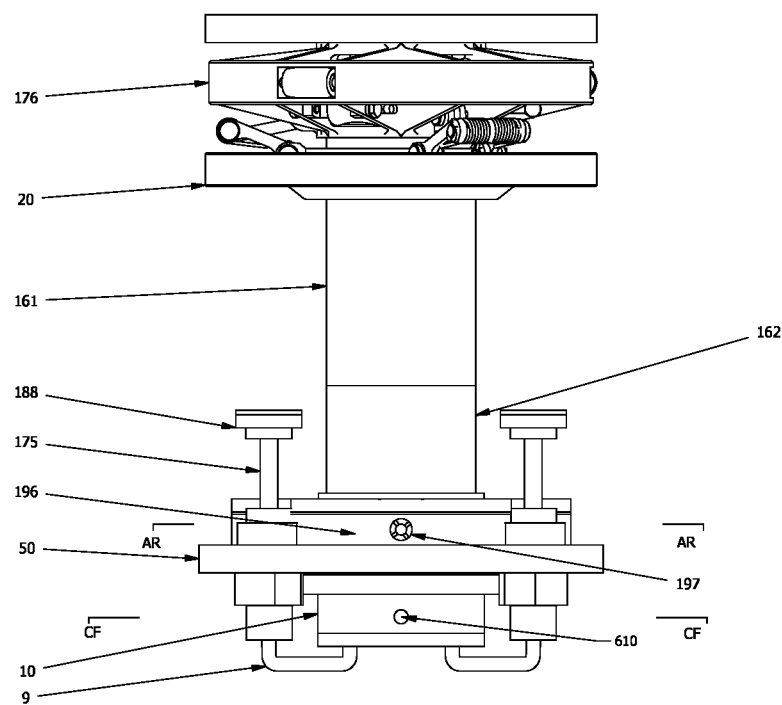
FIG. 55 is a side view of a hydraulic actuator assembly according to an illustrative embodiment.
Figure 56:
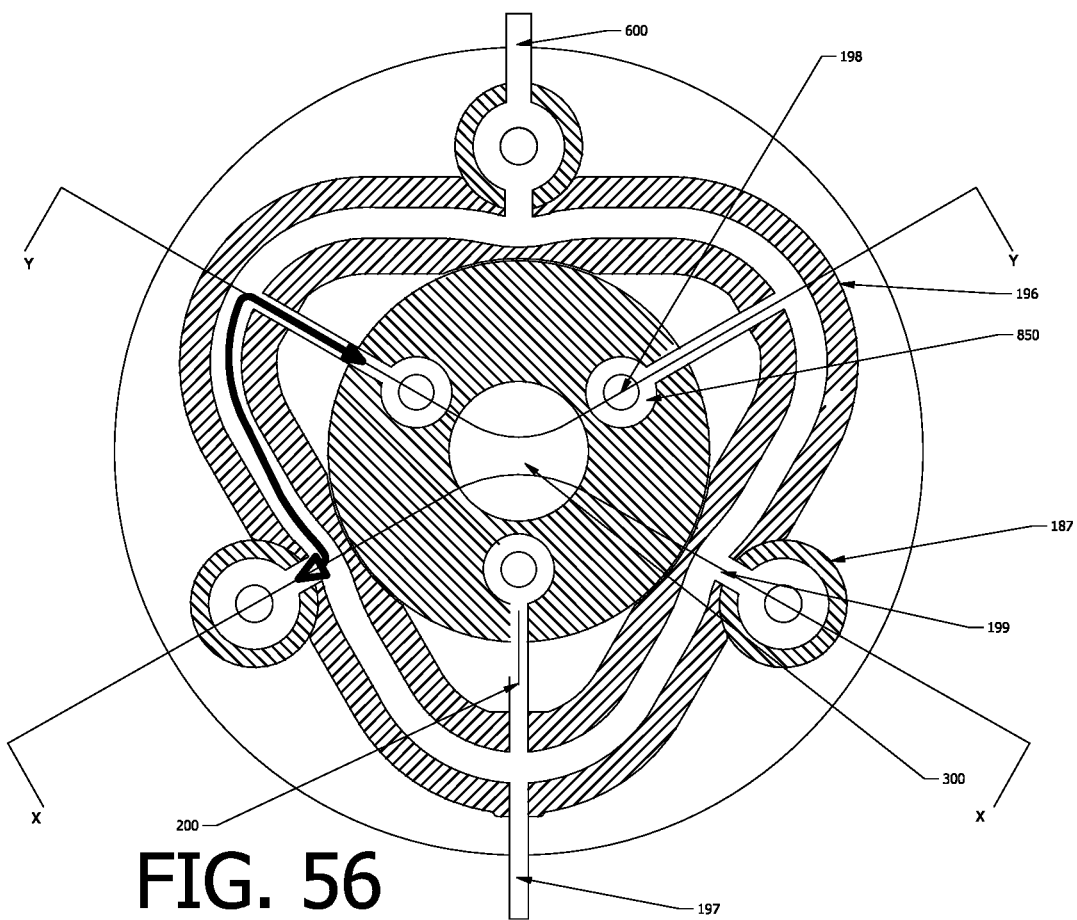
FIG. 56 is a cross-sectional view taken along the line AR-AR of FIG. 55 depicting the flow of hydraulic fluid through the manifold inside the pressure pipe according to an illustrative embodiment.

In some embodiments, referring to FIGS. 53-56, a hydraulic actuator assembly 990 may be filled prior to system operation. In the case of a small hydraulic leak, the system can continue to function by incorporating a hydraulic supply assembly 910 (See FIG. 17). The hydraulic supply assembly 910 may be connected to the center of conduit 160 and may be supplied by impeller pump 194. The outboard side of hydraulic supply assembly 910 may be connected to manifold 10 and to manifold 196 as shown in FIG. 17. The hydraulic supply may be bled from the fluid pumped vertically central to the system by the impeller pump 194 (FIG. 11) and routed via a hydraulic supply fitting 192. The hydraulic supply may have an outboard hydraulic conduit 171 (FIG. 17) connected to the outboard hydraulic manifold 10 (FIGS. 55 and 56). The hydraulic supply may have an inboard hydraulic conduit 195 (FIG. 17) connected to inboard hydraulic manifold 196 (FIG. 18, 19, 53, 54, 55, 56, 70, 71). The outboard hydraulic manifold 10 houses a hydraulic fluid corridor 960. The hydraulic supply may include an inboard hydraulic conduit 199 (FIG. 56) (FIG. 56). Manifold 196 may be connected to port 197. In some embodiments, port 197 is used to fill the system initially and provide additional fluid for manifold 196 if there is a hydraulic leak. Similarly, supply 610 is there to supply manifold 10 for the same purpose. Port 197 leads to manifold 196, which may be covered by a lid 34. Conduit 199 leads from hydraulic cylinder 187 to manifold 196 which routes fluid to hydraulic cylinder 880, via conduit 200. Actuator 198 may be a push/pull rod/actuator which is inside the hydraulic cylinder 880 located inside both manifold 10 and central valve seat 162. A void 850 may be inside the hydraulic cylinder 880 for hydraulic fluid. Both hydraulic cylinder 187 and hydraulic cylinder 880 have an inboard and outboard side where fluid is separated by a dividing plug 46 attached to each hydraulic actuator 198 and 175. Each side (inboard/outboard) may be connected by a manifold. Manifold 196 connects the inboard side while manifold 10 connects the outboard side. A hydraulic supply 610 provides fluid to the manifold 10. The hydraulic supply 610 connects to hydraulic supply line 171. A hydraulic supply 197 supplies fluid to manifold 196. The hydraulic supply 197 connects to supply line 195. The hydraulic supply lines 171 and 195 may be connected by manifold 193 (See FIG. 17). The hydraulic supply assembly 910 may include hydraulic check valve(s) 190 (FIG. 17) to prevent backflow on supply line 195 and supply line 171. An inboard side (closest to conduit 160) hydraulic fluid chamber 850 (FIG. 53, 54) and an outboard side hydraulic fluid chamber 855 (FIG. 53, 54) may be pumped by hydraulic actuator(s) 198. A stopper 46 may divide inboard and outboard sections of the hydraulic cylinder 880. Also, an inboard side (closest to conduit 160) hydraulic fluid chamber 820 (FIG. 70, 71) and an outboard side hydraulic fluid chamber 810 (FIG. 70,71) may be pumped by hydraulic actuator(s) 175. A stopper 46 may divide inboard and outboard sections of the hydraulic cylinder 187. A divider plate 50 may separate the inside from the outside of the pressure chamber 19.

The hydraulic system may include a hydraulic air release valve(s) 189 (See FIG. 9) so that air can be released from the hydraulic system(s). The inboard hydraulic manifold 196 may be fitted with an air release valve 189 (FIG. 9) connected via conduit 600. The outboard hydraulic manifold 10 may also be fitted with an air release valve 189 connected via conduit 860. The air release valve(s) 189 allow air bubbles to escape high point of manifold 196 and manifold 10 (see FIG. 72).

In general, hydraulic fluid in outboard side hydraulic fluid chamber 855 moves to and from space 810 (which is the space within hydraulic cylinder 187 where hydraulic fluid flows to and from) (FIG. 71) via manifold 10 connected by conduits. Simultaneously, fluid moves in inboard side hydraulic fluid chamber 850 (FIG. 53) to and from 820 (which is the space in the inboard side of hydraulic cylinder 187 where hydraulic fluid flows to and from) (FIG. 71) via manifold 196 (FIG. 56) connected by conduits. This causes hydraulic actuators 175 (FIG. 53) and hydraulic actuators 198 to move in opposite directions. These movements open and close the space 400 (FIG. 54) which controls incompressible fluid exiting from pressure chamber 19.

Figure 71:
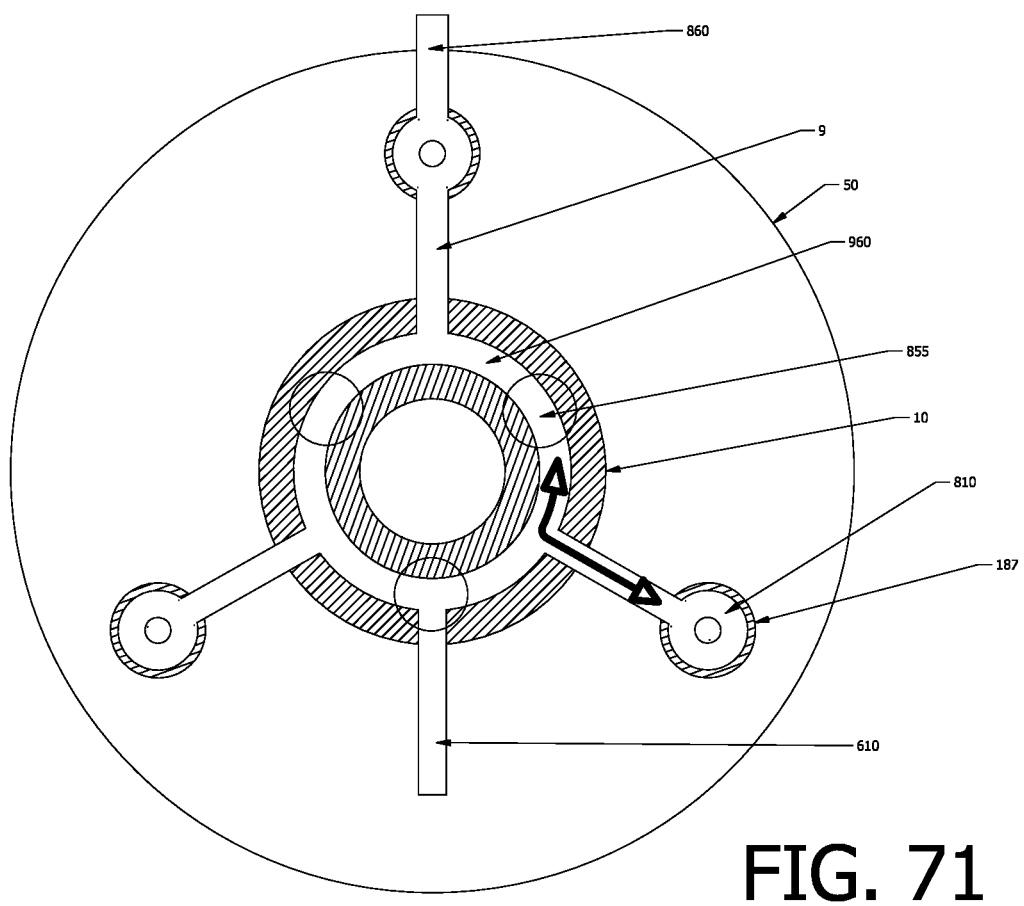
FIG. 71 is a cross-sectional view of the hydraulic actuator assembly taken along the line CF-CF of FIG. 55 depicting the flow of hydraulic fluid through the manifold 10 outboard of pressure pipe 19 according to an illustrative embodiment.
Figure 78:
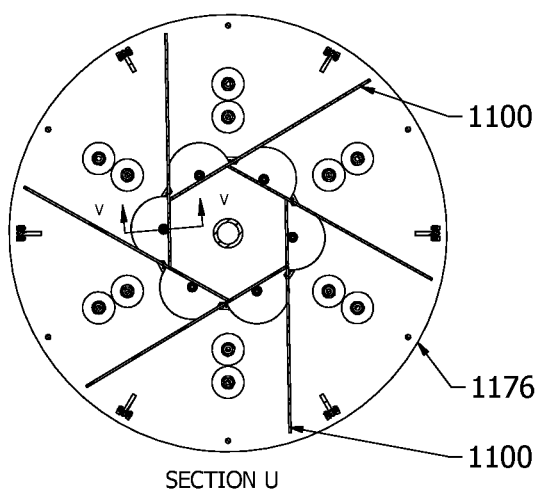
FIG. 78 is a top view of the hydraulic assembly of FIG. 75 taken along the line U-U of FIG. 74.
Figure 79:
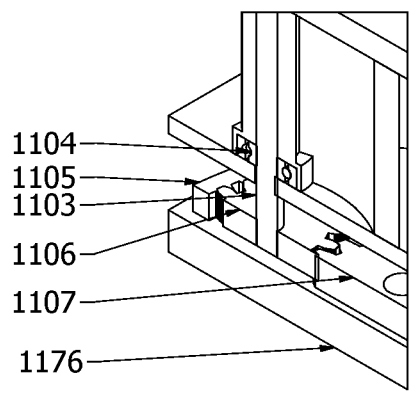
FIG. 79 is a partial perspective view of detail V taken along line V-V from FIG. 78.

As piston wall 20 moves outboard away from conduit 160 (FIG. 11), the piston wall 20 will eventually come into contact with hydraulic actuator head 188 (FIG. 53), moving hydraulic actuator 175, pushing hydraulic fluid in 810 (FIG. 70) outboard by pushing divider plug 46. As hydraulic fluid is pushed out of 810, the fluid will travel via conduit 9 then via channel 960 located inside manifold 10. The fluid will further travel into outboard side hydraulic fluid chamber 855 applying pressure to plug 46 attached to hydraulic actuator 198 which then pushes central valve head 161 causing it to open so that incompressible fluid can exit pressure chamber 19 via opening 400 then further travel outboard along conduit 300 flowing back into tank 88 to be recycled in the process. Simultaneously, hydraulic fluid will travel from inboard side hydraulic fluid chamber 850 (FIG. 53), exiting via conduit 200 (FIG. 56) into manifold 196 (FIG. 56), then into conduit 199 (FIG. 56), entering 820 (FIG. 71). As the central valve head 161 returns to its original position, closing 400 and making contact with 162 the hydraulic flow described works in reverse.

Figure 3:
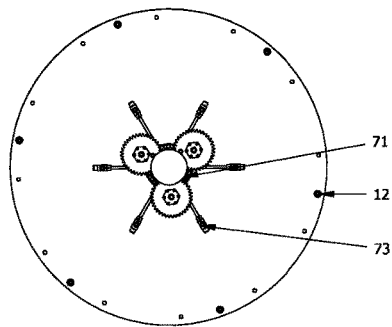
FIG. 3 is a top view of the gas compressor system of FIG. 1.
Figure 2:
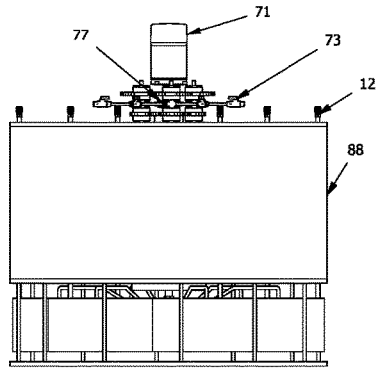
FIG. 2 is a side view of the gas compressor system of FIG. 1.
Figure 1:
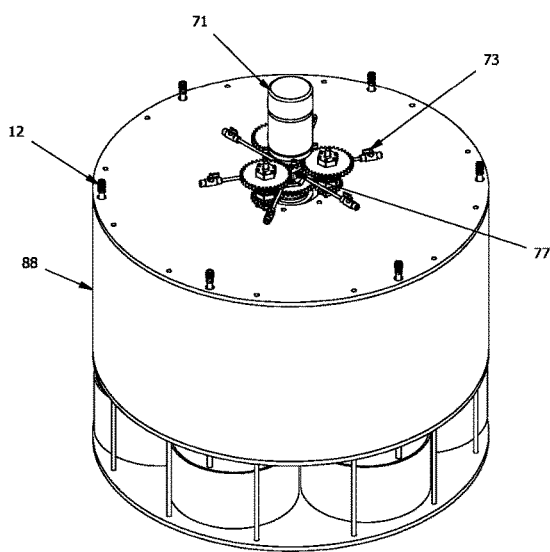
FIG. 1 is a perspective, elevation view of a gas compressor system in accordance with embodiments of the subject apparatus.
Figure 5:
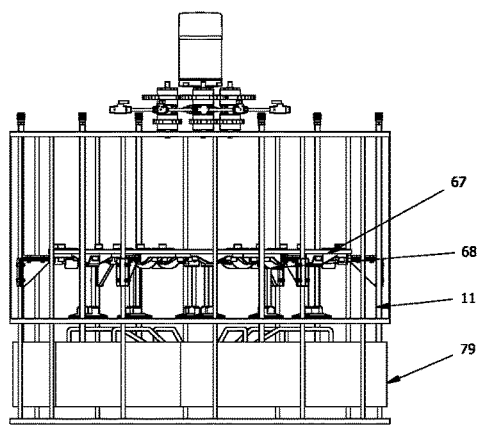
FIG. 5 is a side view of the gas compressor system of FIG. 4.
Figure 4:
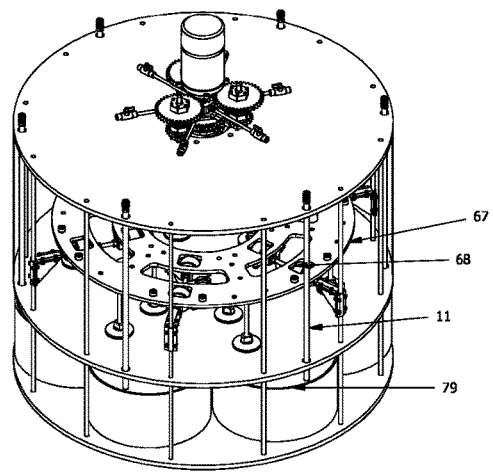
FIG. 4 is a perspective, elevational, internal view of the gas compressor system of FIG. 1, with a tank section removed.
Figure 8:
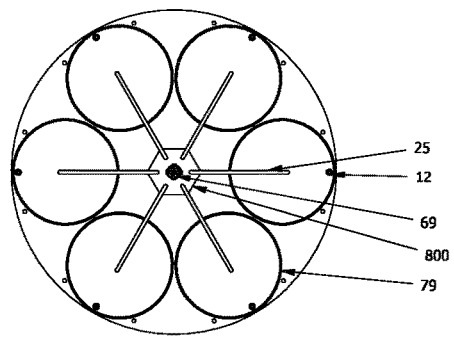
FIG. 8 is a top view of the compressible fluid tank assembly of FIG. 6.
Figure 7:
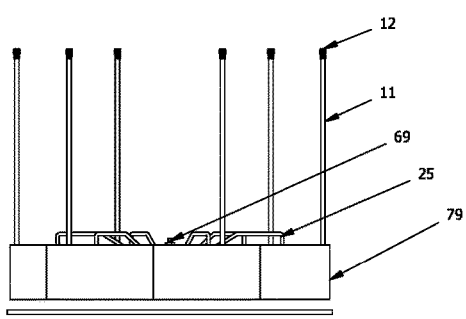
FIG. 7 is a side view of the compressible fluid tank assembly of FIG. 6.
Figure 6:
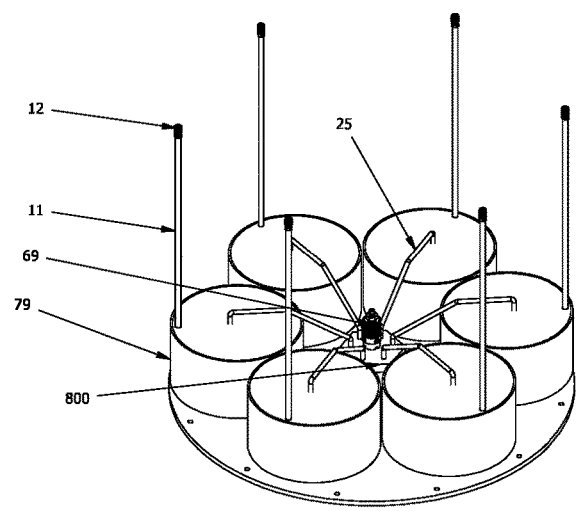
FIG. 6 is a perspective, elevational, internal view of a compressible fluid tank assembly in the gas compressor system of FIG. 1 according to an illustrative embodiment.

Referring back to FIGS. 11 and 12, in some embodiments, a smaller conduit 360 inside central conduit 160 allows some of the pressure from impeller pump 194 to be routed via 360, to the rotary union 70 and external to the rotational assembly 1600. In some embodiments, the system may operate as an auxiliary pump by bleeding incompressible fluid from the system via conduit 360 located in central conduit 160 and the rotary union 70. Fluid may be further routed via the six to one manifold 77. The fluid flow may be controlled by one or more shut off valves 73 (FIG. 1). This may be helpful in for example, a shipboard application where extra water created by condensation can be filtered and used if needed.

Figure 99:
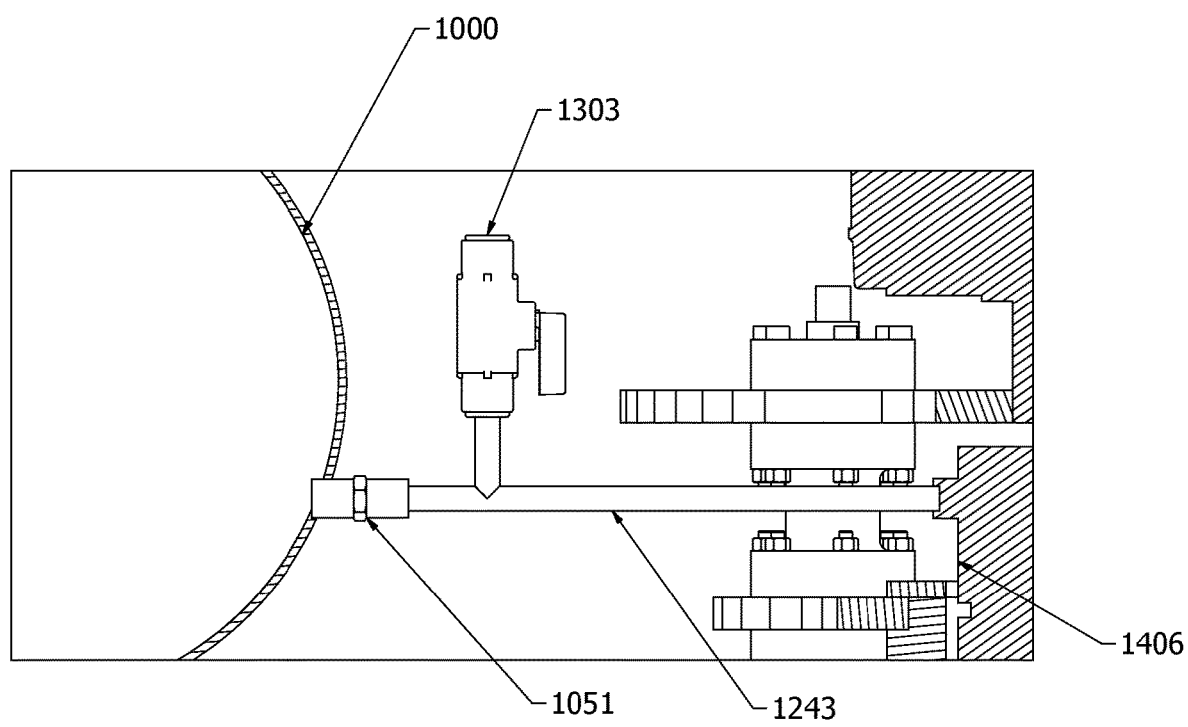
FIG. 99 is an enlarged sectional view of a compressed gas release mechanism taken along the line AL-AL of FIG. 73.

Referring now to FIGS. 72-74, another embodiment of a unified air compressor (UAC) system is shown. The UAC system may include a compressed gas tank 1000 which may be placed at a higher elevation relative to the rotational assembly 1600. The UAC system shown in FIGS. 72-74 (and in portions beyond FIGS. 72-74) can also create electricity in addition to compressed gas/air. One or more electromagnetic modules may generate power from the rotation of rotational assembly 1600. The UAC system may include a power supply 1001 that aggregates electricity created by the UAC system. In some embodiments, the power supply 1001 may be an auxiliary element connected externally to the UAC system. The UAC system may include a multi-passage rotary union 1406 (See FIGS. 92 and 93 which shows the cross-section AC in FIG. 74) in the center of the system. One of the passages in rotary union 1406 may route compressed air/gas to tank 1000 via conduit 1243 (FIG. 99) through check valve 1051 (FIG. 99). A different passage in rotary union 1406 provides a route for pressurized fluid via conduit 1420, to valve 73.

Figure 100:
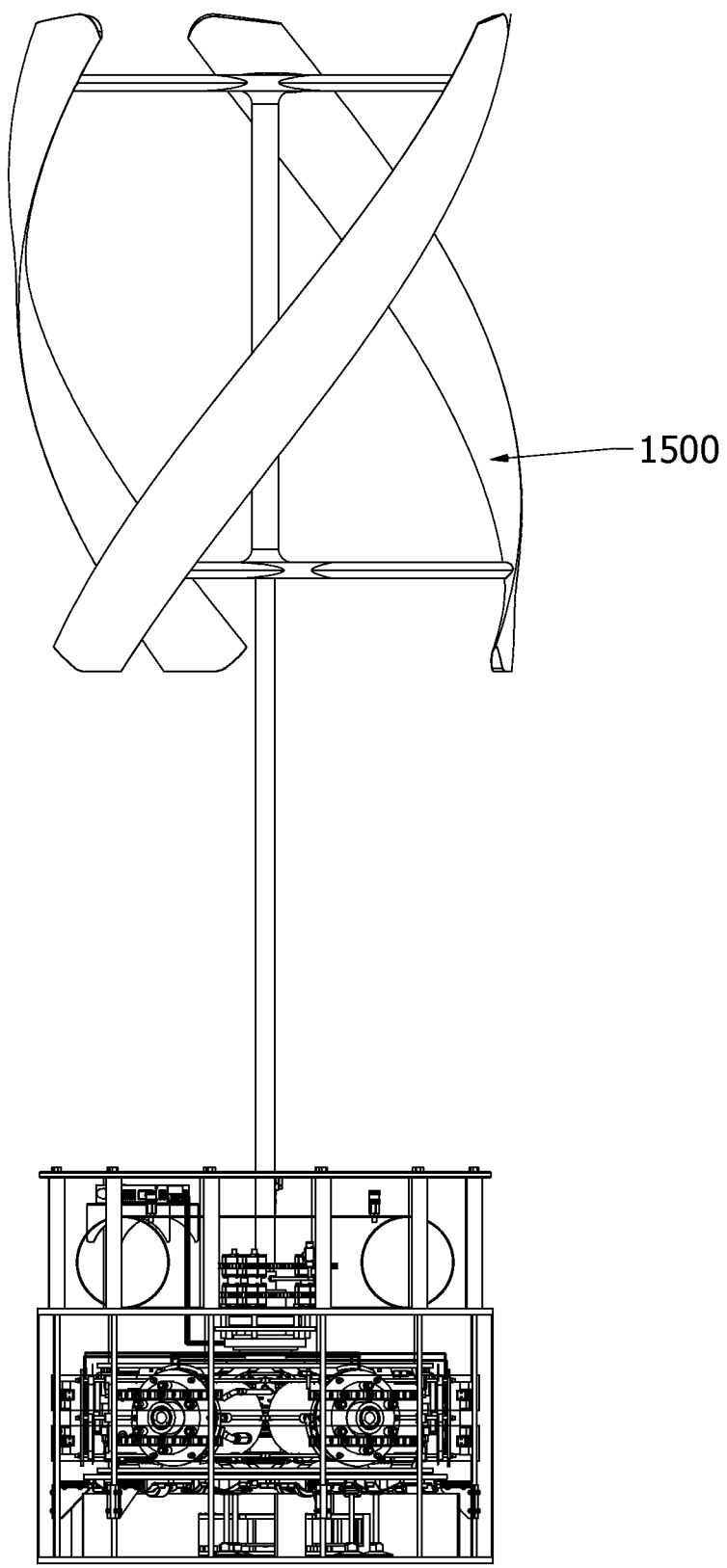
FIG. 100 is a side view of a gas compressor system including a wind driven rotational input in accordance with another embodiment of the subject technology.
Figure 101:
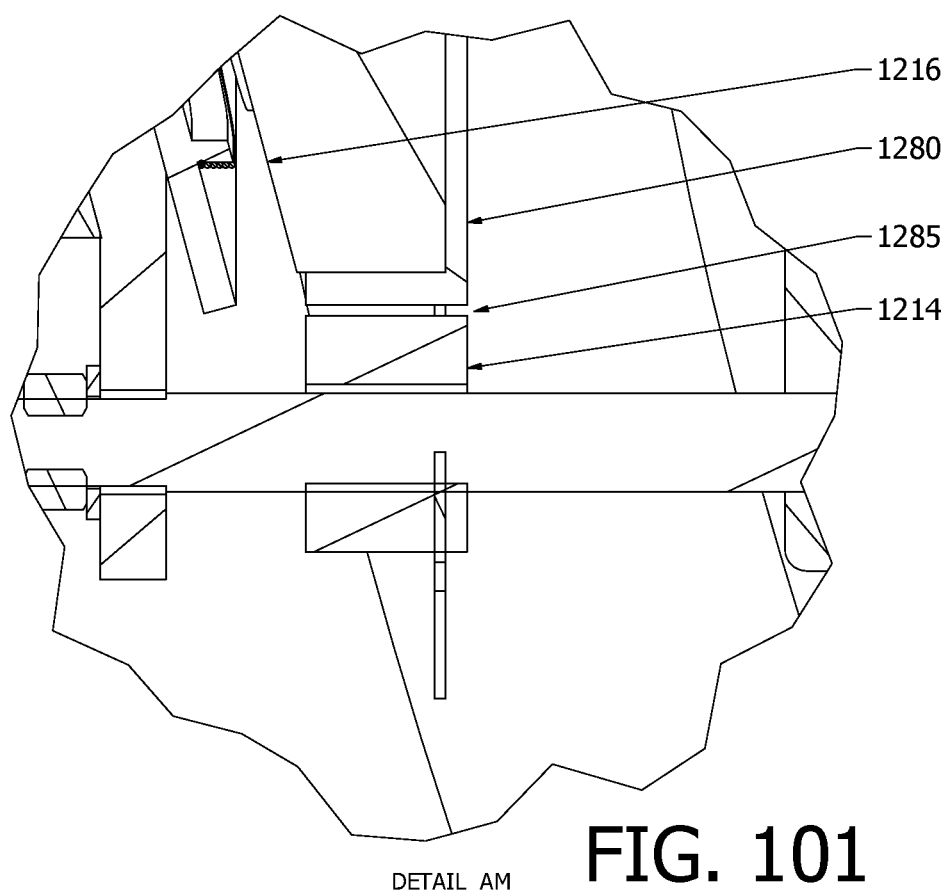
FIG. 101 is an enlarged sectional view of circle AM of FIG. 80 showing a magnetic flywheel air gap consistent with embodiments.

Referring to FIG. 100, it is demonstrated here how wind power may be harnessed by the UAC system as a rotational input. In some embodiments, the UAC system includes a set of wind turbine blades 1500. The blades 1500 may be for example, a set of helical airfoils.

Figure 82:
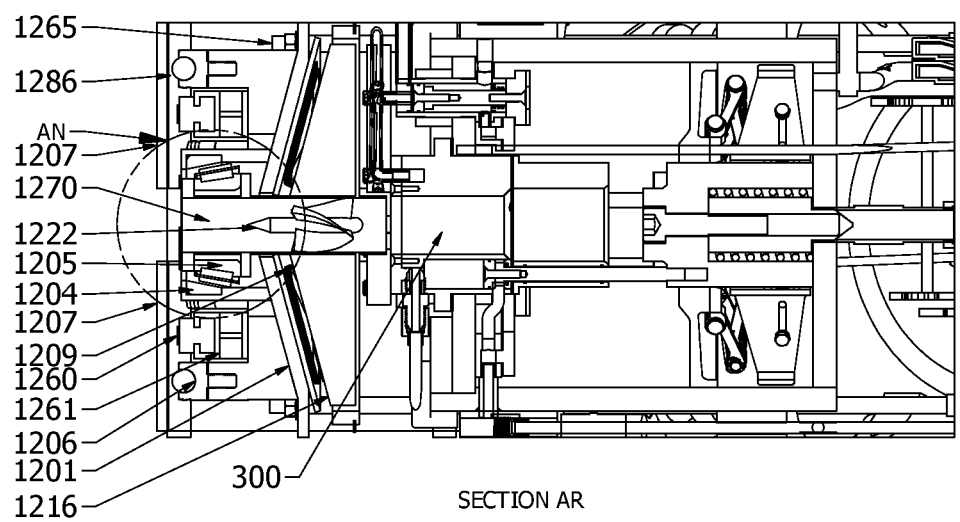
FIG. 82 is a sectional view of taken along the line AR-AR of FIG. 80.
Figure 83:
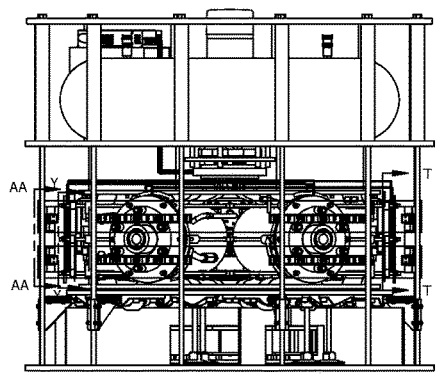
FIG. 83 is a side view of the piston assembly of FIG. 81 provided from a different side.
Figure 84:
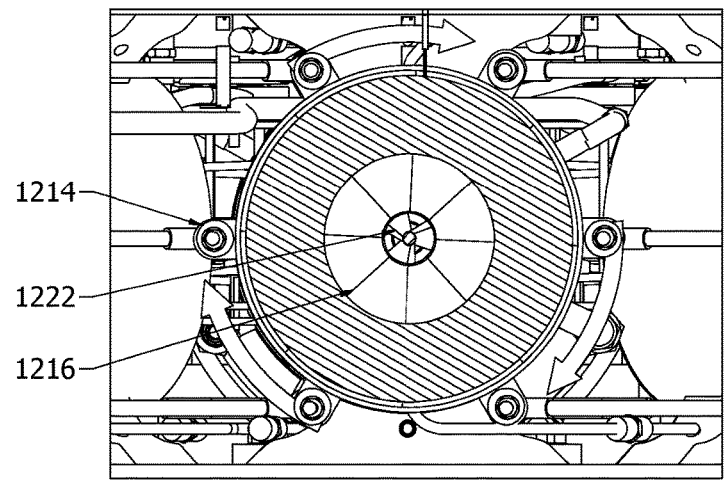
FIG. 84 is a side view of a piston taken along the line Y-Y of FIG. 83.
Figure 85:
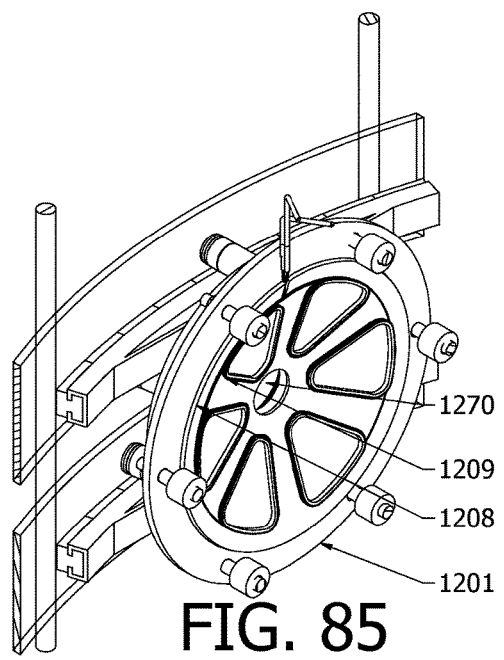
FIG. 85 is an enlarged isolated perspective view of a coil, stator, and conductive plate assembly in the gas compressor system of FIG. 72 consistent with embodiments of the subject technology.
Figure 86:
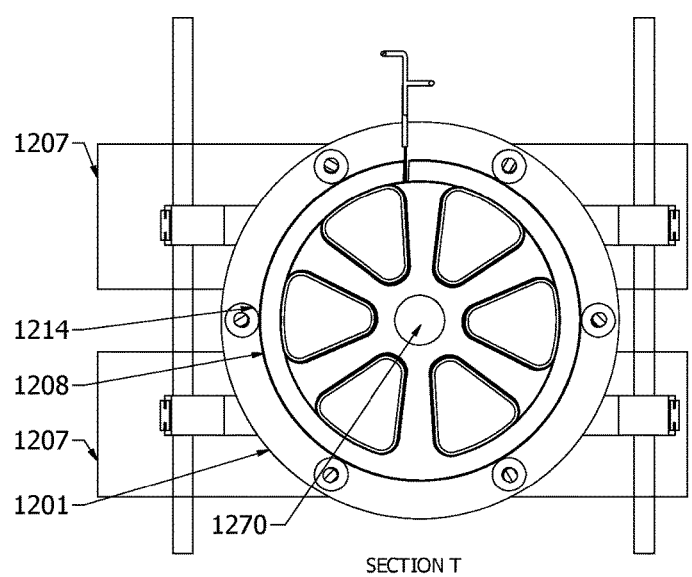
FIG. 86 is a side view of the assembly shown in FIG. 85 taken along the line T-T of FIG. 83.

Due to centripetal forces and pressure, fluid will rapidly exit fluid release conduit 300 (FIGS. 16, 54, 56, 69, 70). Referring to FIGS. 80, 82, and 84, the top view of a piston head assembly is shown. This fluid can be utilized to turn impeller 1222 connected to casing 1280 (FIG. 80). One example of an electromagnetic module may be present in the casing 1280. Casing 1280 may enclose, for example, a magnetic flywheel 1216. The casing 1280 turns with the magnetic flywheel. This way when the impeller turns so does the magnetic flywheel 1216. The magnetic flywheel 1216 may be arranged in the form of a Halbach array, which can act as a flywheel to harness the benefits of gyroscopic precession. The magnetic flywheel 1216 may also induce a current in coil 1209. The magnetic flywheel 1216 may be arranged so that the magnetic field is directed outwards towards coil 1209. The coil 1209 may be attached to a stator 1208 (See FIGS. 85, 86, 89, 90, 91). The stator 1208 may be mounted on conductor plate 1201 (FIGS. 80, 82, 85, 86, 89, 90, 91). The magnetic flywheel 1216 may be laterally supported by a bearing 1214 (FIGS. 80, 84, 86, 88). A small airgap may be present between bearing 1214 and the magnetic flywheel 1216.

Figure 102:
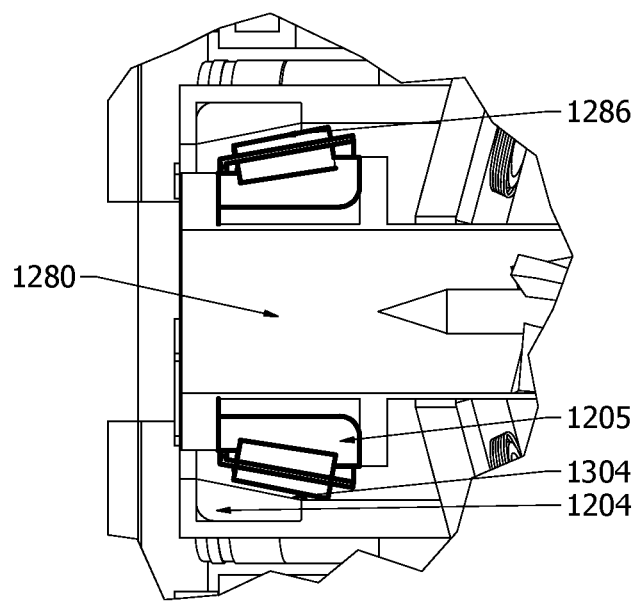
FIG. 102 is an enlarged sectional view of circle AN of FIG. 82 showing a tapered bearing air gap consistent with embodiments.

The casing 1280 (FIG. 80) may be coupled to one half of a tapered bearing (FIGS. 80, 82, 102). The tapered bearing may be a two-piece bearing. One half fits inside the other half, similar to a thrust bearing. In one embodiment, the inboard side of the bearing is 1205. The outboard side is 1204. The inboard bearing side 1205 fits inside outboard bearing side 1204. The tapered bearing may help the magnetic flywheel 1216 stay centered. In addition, the magnetic flywheel 1216 may be thicker in the center to also help keep centered during rotation.

Figure 87:
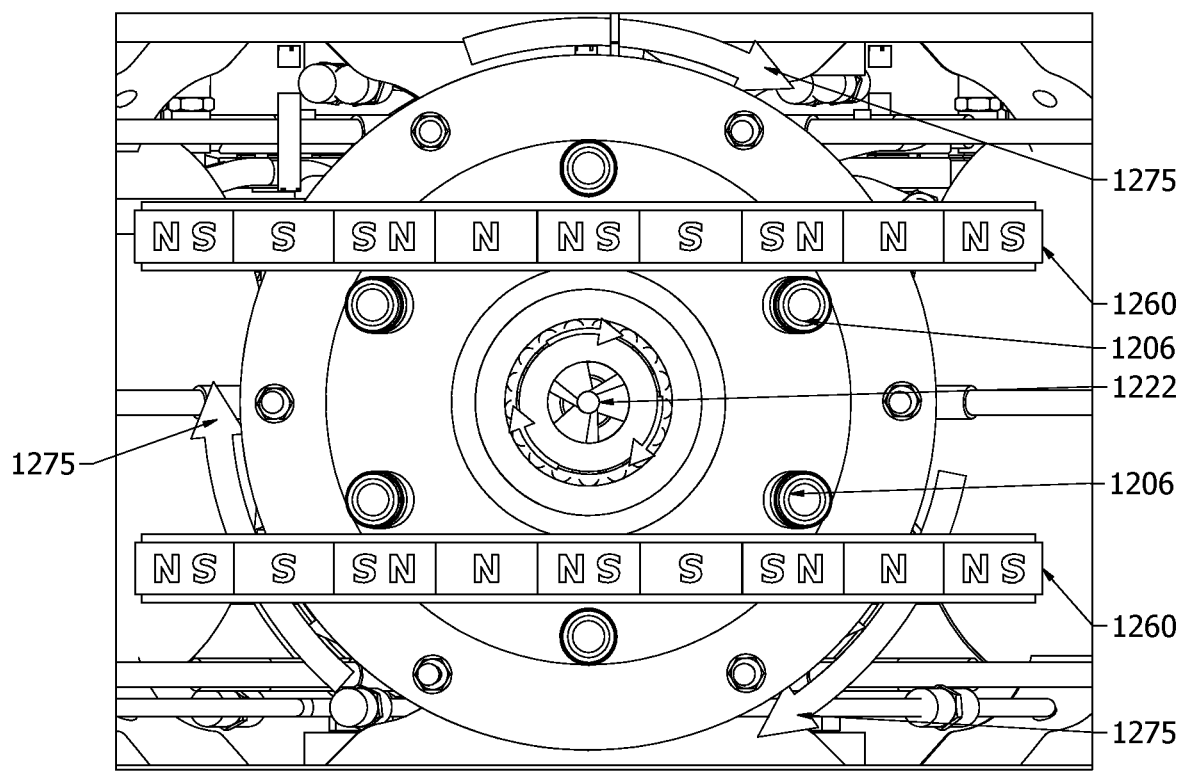
FIG. 87 is a side view of a side view of a magnet bar assembly taken along the line AA-AA of FIG. 83.
Figure 88:
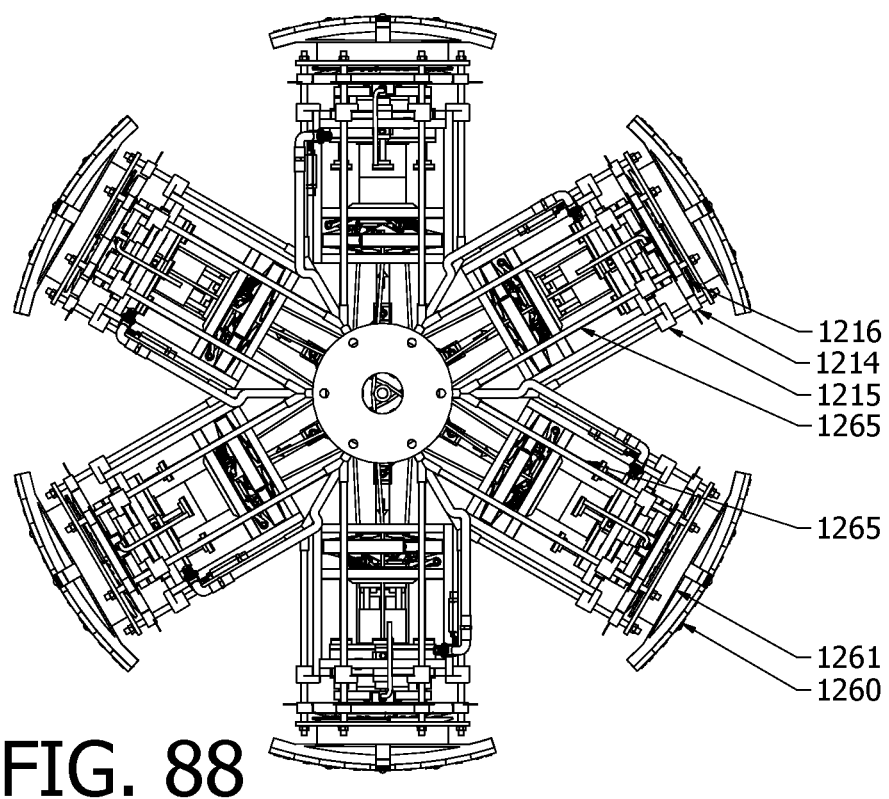
FIG. 88 is an isolated top view of the piston assembly of FIG. 81.
Figure 103:
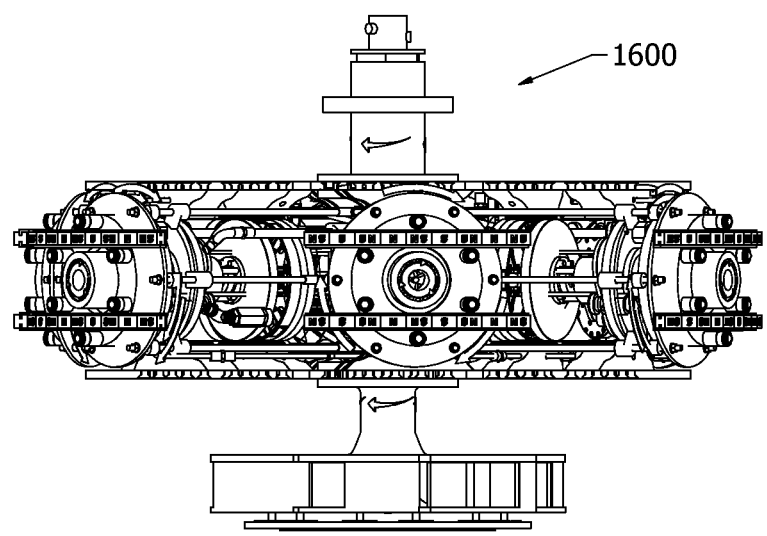
FIG. 103 is an isolated side view of a rotational assembly consistent with embodiments.

In some embodiments, a curved bracket 1261 (FIGS. 80, 82, 88) may be mounted on the back of a conductor plate 1201 (FIG. 80). Some embodiments may include a Halbach array bar 1260 (FIGS. 80, 82, 87, 88) mounted on a curved bracket 1261 (where curvature may be present on the outboard side). The magnetic field from the Halbach array bar 1260 may be directed outward towards a conductive ring 1207 (which may be a pair of plates encircling the rotational assembly 1600) (FIGS. 72, 74, 80, 82, 86). The rotational assembly 1600 may be further supported by ball transfers 1206 (FIGS. 82, 87). An air gap may be present between ball transfers 1206 and conductive ring 1207. In this way the ball transfers 1206 help support the rotational assembly 1600 FIG. 103 during startup until magnetic forces can stabilize the rotational assembly 1600.

Referring to FIGS. 92-97, a flange bracket 1401 may be connected to the center conduit 160. The flange bracket 1401 may contain a Halbach array 1400. The magnetic field from Halbach array 1400 may be directed downward towards conductor plate 1430. The conductor plate 1430 may be held in place by support rods 1184.

Utilizing Magnetic Levitation/Repulsion

As central conduit 160 rotates, the Halbach array 1400 will also rotate over conductive plate 1430. This will result in levitation and an air gap between the rotational assembly 1600 and rollers 68 (See FIGS. 4, 5) reducing friction and parasitic drag. As the magnetic flywheel 1216 (FIG. 80) rotates, the flywheel will generate a magnetic field that may interact with the conductor plate 1201. This interaction causes a repulsive force away from the conductor plate 1201 and levitation relative to centripetal forces. This levitation can create an air gap within tapered bearing 1204 and 1205 (FIG. 102). It is possible that as magnetic repulsion occurs and flywheel 1216 begins to align, the flywheel will make little or no contact within tapered bearing 1204/1205 FIG. 102) and bearing(s) 1214. Meaning, the magnetic flywheel 1216 can freely rotate very closely to other components without making physical contact that could result in parasitic drag.

As rotational assembly 1600 rotates, the magnetic Halbach array bar 1260 (FIG. 80) will create a magnetic field directed towards conductive rings 1207 (FIGS. 72, 74, 80, 82, 86). This magnetic field may cause a repulsive force away from conductive rings 1207 that can help stabilize the rotational assembly under the stresses of centripetal forces. In this way magnetic repulsion can help stabilize rotational assembly 1600 with little or no friction.

As should be appreciated, since the UAC system uses permanent magnets moved over a conductive surface, an energy field is created that causes a repulsive force and levitation of different elements against different surfaces. The UAC system utilizes this phenomenon to increase overall efficiency by reducing friction in the system.

Utilizing Gyroscopic Precession

Referring to the magnetic flywheel 1216 (FIG. 80), the UAC system may take advantage of the phenomenon known as gyroscopic precession which can change the angular momentum in the direction of torque. When the rotation of the magnetic flywheel 1216 is induced, in part due to the action of impeller 1222 (FIGS. 80, 87) a further efficiency can be realized. Due to gyroscopic precession, the downward force of the magnetic flywheel 1216 can be reduced. In addition, the direction of angular moment can be changed in the same direction of torque FIG. 9. This can result in the reduction of load on rotational source 71 (FIGS. 41, 42, 43). An additional efficiency can be realized when the magnetic flywheel induces a current in coil 1209 (FIG. 80).

UAC Operating as an Electrical Generator

Figure 89:
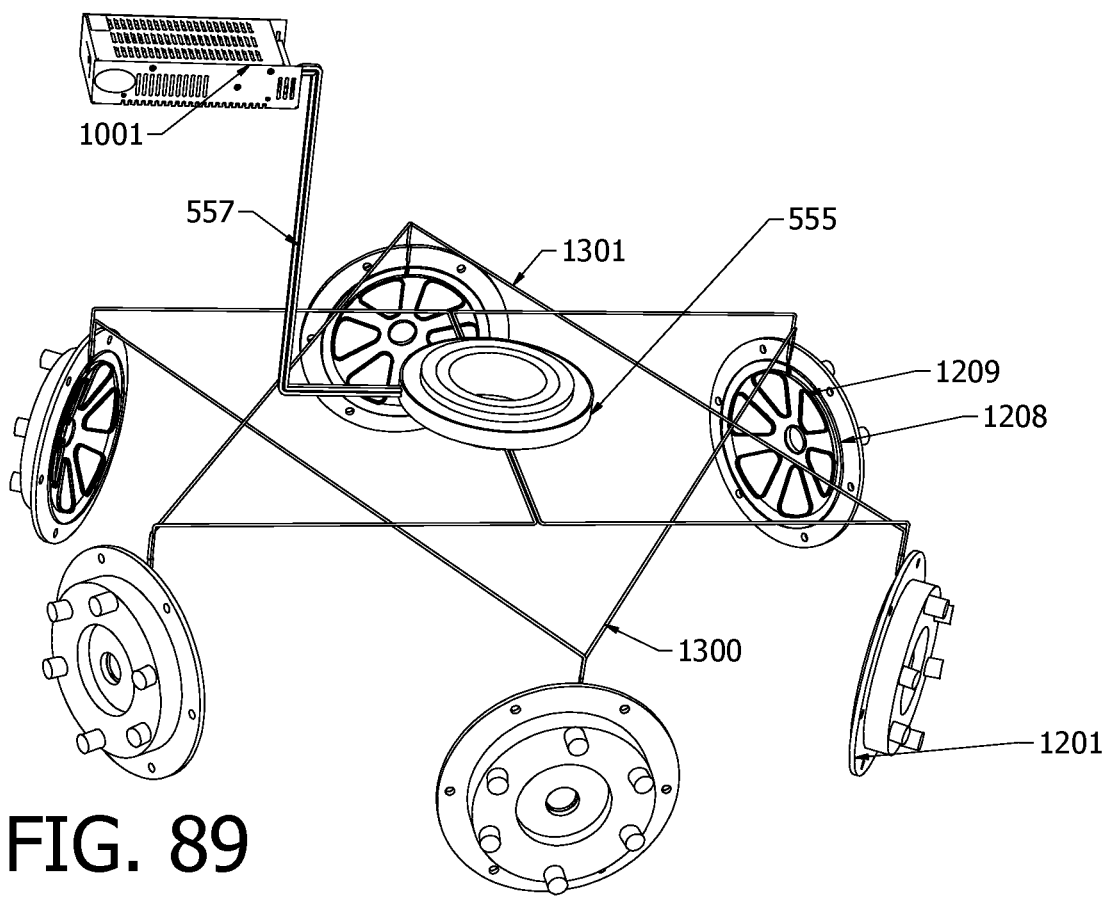
FIG. 89 is a perspective view of power assemblies isolated from respective stator sets consistent with embodiments.
Figure 90:
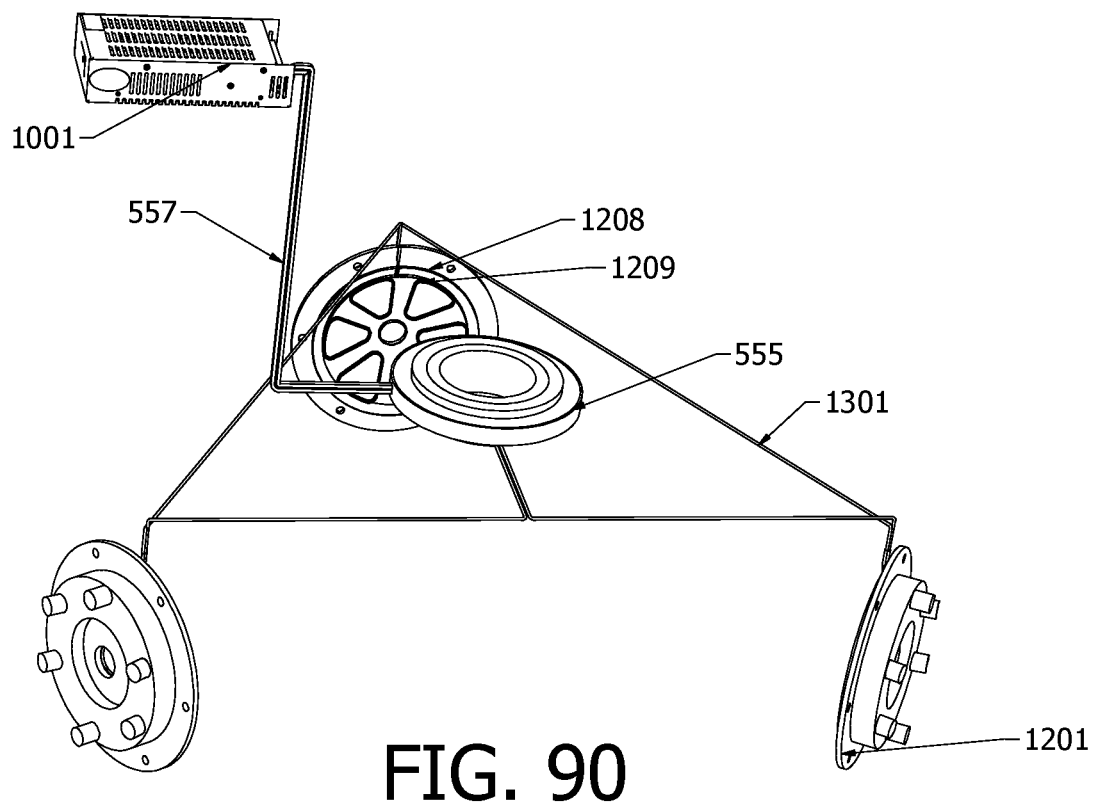
FIG. 90 is a perspective view of an isolated single power assembly shown in FIG. 89.
Figure 91:
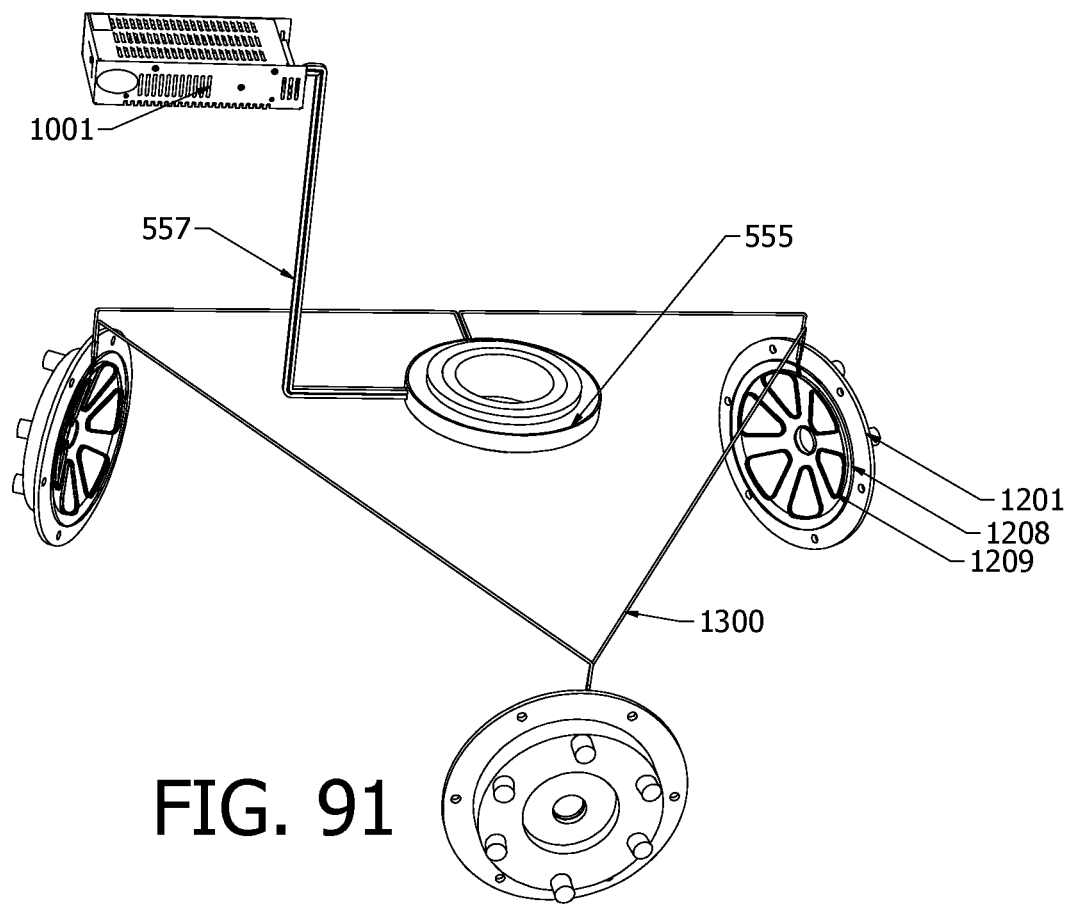
FIG. 91 is a perspective view of an alternate, isolated single power assembly shown in FIG. 89.
Figure 94:
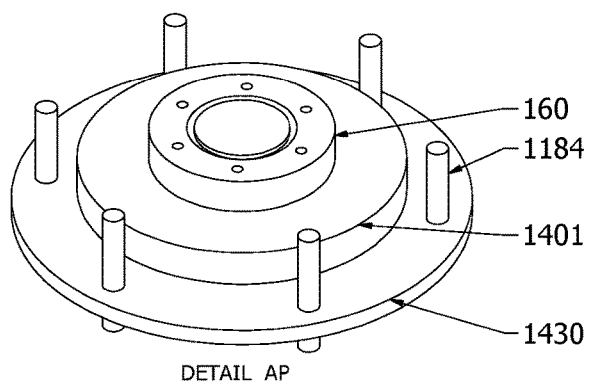
FIG. 94 is a top perspective view of a levitation assembly of the gas compressor system of FIG. 72 consistent with embodiments.
Figure 95:
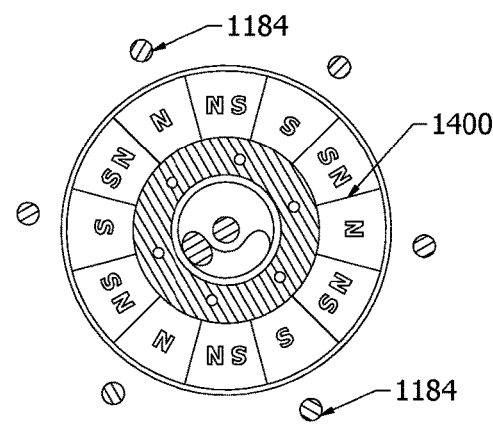
FIG. 95 is a top view of a magnetic array taken along the line AE-AE of FIG. 93.
Figure 96:
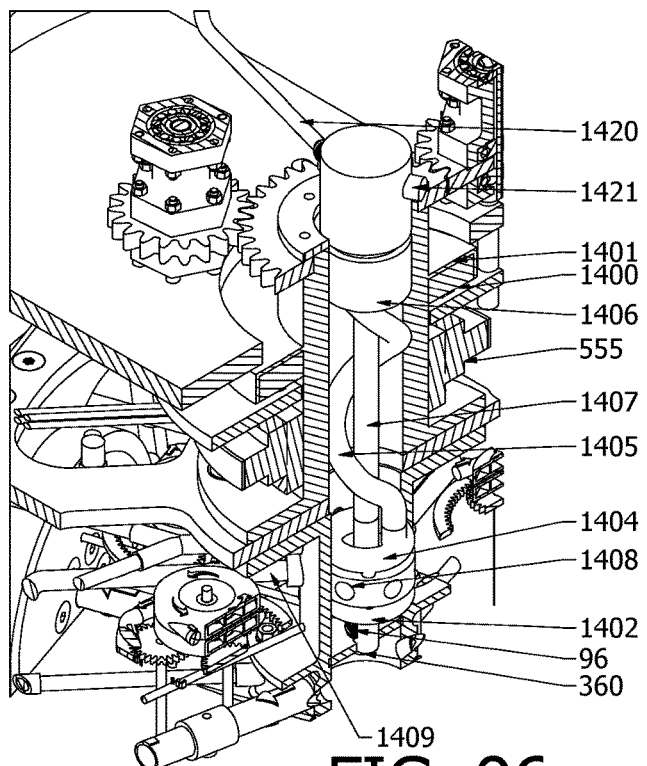
FIG. 96 is a perspective, cross-sectional view of the longitudinal center axis of the gas compressor system of FIG. 72 consistent with embodiments.
Figure 97:
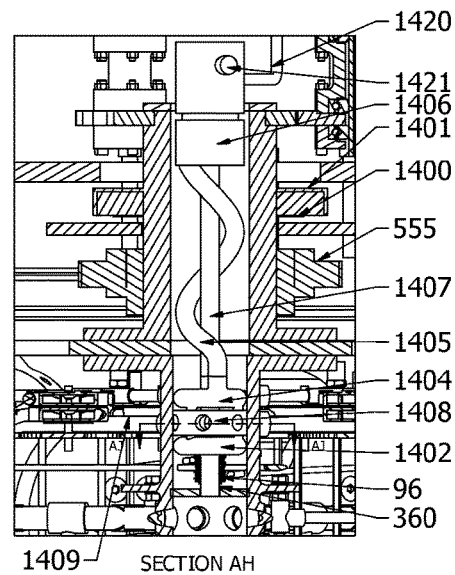
FIG. 97 is a side cross-sectional view taken along line AH of FIG. 74.
Figure 98:
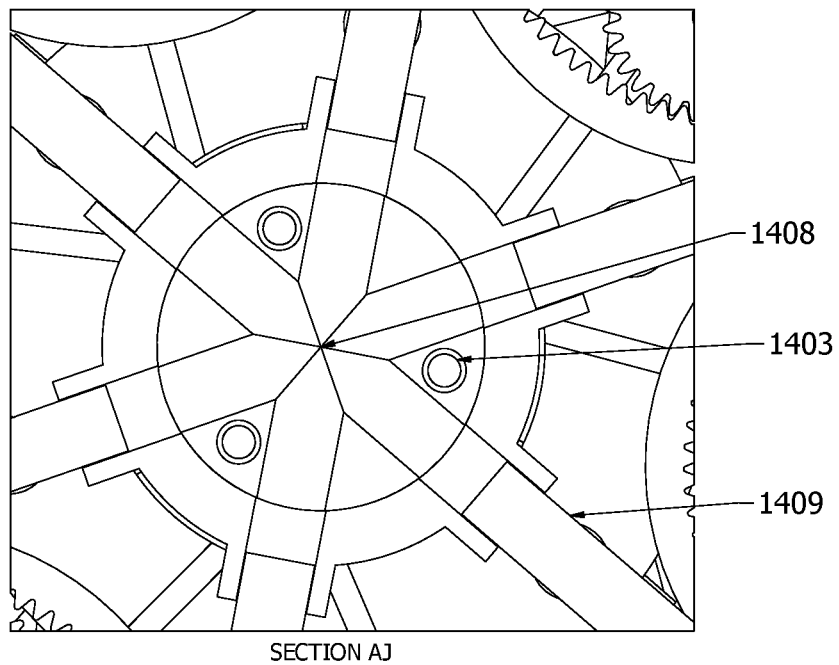
FIG. 98 is an enlarged top sectional view of a compressed gas manifold taken along the line AJ-AJ of FIG. 97.

Referring to FIGS. 85, 86, 89, 90, 91, the magnetic flywheel 1216 may induce a current in coil 1209 (FIG. 80) and routed to power supply 1001. Each coil 1209 may be configured to generate a three-phase signal. Three coils may be wired in one circuit 1301 (circuit 1) (FIG. 90). The alternate coils may be wired in a different circuit 1300 (circuit 2) (FIG. 91). Both circuits may be routed out of the rotational assembly 1600 via slip ring 555 (FIGS. 89, 90, 91). Both circuits may be further routed via wires 557 to power supply 1001.

The electrical output of the UAC system via power supply 1001 may be increased. As the pressure increases in tank 1000 the backpressure on piston wall 20 (FIG. 21) can also increase. This backpressure may cause piston wall 20 to reciprocate at a slower speed reducing the amount pressurize fluid released from conduit 300 (FIGS. 53, 54). This reduction in fluid can result in a reduction of speed of magnetic flywheel 1216. When the speed of magnetic flywheel 1216 is decreased, the output to power supply 1001 can also decrease. The backpressure on piston wall 20 can be reduced by releasing pressurized gas/air. The reduction in backpressure may increase the reciprocation speed of piston wall 20. This increase in reciprocation speed may also increase the rotational speed of flywheel 1216 resulting in an increased output to power supply 1001. Referring to FIG. 99, a regulator 73 may be adjusted to release all or some of the pressurized gas/air originating from rotational assembly 1600. When the regulator 73 is opened to release compressed air, the back pressure on piston wall 20 (FIG. 21) may be reduced. When the backpressure is reduced, piston wall 20 can reciprocate faster increasing the volume of pressurized fluid released via conduit 300 to impact impeller 1222. The increase in fluid release may increase the rotational speed of the magnetic flywheel 1216 and subsequent electrical output.

When the regulator 73 is completely open so that no compressed gas/air is collected in tank 1000, the UAC system may perform solely as an electrical generator in some embodiments. In this way, the regulator 73 may be adjusted to control the output ratio of compressed gas/air verses electricity.

Method to Increase in Hydraulic Pressure

Referring to FIGS. 75-79, the UAC system may increase the hydraulic pressure by an arrangement of smaller hydraulic impeller(s) 1101 (FIG. 76) inside a larger hydraulic impeller 1102 (FIG. 76). The impeller 1101 may be connected to a shaft 1103 (See for example, FIGS. 75, 76, and 79). The shaft 1103 may be connected to the planet gear 1106. Shaft 1103 may be connected to a set of bearings 1104 to help facilitate proper rotation. Shaft 1103 may connect a smaller hydraulic impeller 1101 to a larger hydraulic impeller 1102. A sun gear 1107 may be fixed in place by brackets. 1176 (which may appear as a plate). Rotational source 71 may cause the larger hydraulic impeller 1102 to rotate. When the larger hydraulic impeller 1102 rotates, the planet gear 1106 will interact with the sun gear 1107 which will cause the smaller hydraulic impeller 1101 to rotate. Referring temporarily to FIGS. 104 and 105, a ring gear 1105 may cooperate with the sun gear 1107 for travel of the planet gears 1106 along their circular path. The rotation of one or more impeller(s) 1101 will increase the pressure of the hydraulic fluid in central conduit 160 without increasing the rotation of rotational source 71. An increase of hydraulic fluid will increase the overall output of the UAC system.

Those of skill in the art would appreciate that various components and blocks may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. For example, while the piston protocol was described as using six compression chambers, it should be understood that a different number of chambers may be used. In addition, while the pistons were described as being controlled with one piston moving opposite an opposing piston, other timing and frequency of piston oscillations may be used. In addition, while the rotary elements show the incompressible fluid being drawn "up" the shaft to the pressure chambers, some embodiments may position the pressure chambers below the impeller pump and draw the incompressible fluid "down" the shaft. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus, comprising:
   an incompressible fluid source for storing an incompressible fluid;
   a rotational driving input source;
   an electromagnetic module coupled to the rotational driving input source, wherein electrical power is generated by operation of the electromagnetic module via the rotational driving input source;
   a rotary shaft coupled to the incompressible fluid source and to the rotational driving input source, wherein operation of the rotary shaft draws the incompressible fluid up or down the rotary shaft;
   a set of pistons coupled to the rotational driving input source, wherein the set of pistons includes a first piston coupled to a second piston, wherein:
      the first piston is positioned in a first pressure chamber and the second piston is positioned in a second pressure chamber, and
      the rotational driving input source drives a centripetal actuation of the first piston and of the second piston;
   a compressible gas source coupled to the first pressure chamber and to the second pressure chamber;
   a controlled fluid valve assembly coupled to the first pressure chamber and to the second pressure chamber, wherein:
      the incompressible fluid is delivered to the first piston by the controlled fluid valve assembly, to drive the first piston, wherein driving the first piston compresses the compressible gas in the first pressure chamber,
      the incompressible fluid is released from the first pressure chamber, by the controlled fluid valve assembly,
      the incompressible fluid is alternately delivered to the second pressure chamber by the controlled fluid valve assembly to drive the second piston, in the event the incompressible fluid is released from the first pressure chamber, wherein driving the second piston compresses the compressible gas in the second pressure chamber, and compressed gas from the first pressure chamber and from the second pressure chamber is released through a port to provide a source of the compressed gas.

2. The apparatus of claim 1, further comprising an impeller coupled to the rotary shaft, wherein the impeller is positioned to draw the incompressible fluid up or down the rotary shaft in a response to the rotary shaft being rotated and increase a fluid pressure on the first piston and on the second piston.

3. The apparatus of claim 1, further comprising a return line coupled to the first pressure chamber and coupled to the incompressible fluid source, wherein the incompressible fluid is returned from the first pressure chamber to the incompressible fluid source through the return line.

4. The apparatus of claim 1, further comprising:
a first valve coupled to an inlet of the first pressure chamber;
a second valve coupled to an inlet of the second pressure chamber; and wherein
the operation of the rotary shaft generates a centripetal force, and
the first valve is configured to open in response to the centripetal force and the second valve is configured to close in response to the centripetal force, simultaneously with the opening of the first valve.

5. The apparatus of claim 1, further comprising a rotary union coupled to the rotary shaft for housing electrical components in place while the rotary shaft is rotated.

6. The apparatus of claim 1, further comprising a cable system coupled to the first piston, wherein the cable system is configured to alternately reciprocate the first piston from a fully actuated position to a fully retracted position.

7. The apparatus of claim 6, wherein the cable system is simultaneously coupled to the second piston and is configured to alternately reciprocate the second piston from a fully actuated position to a fully retracted position.

8. The apparatus of claim 7, wherein the cable system is configured to position the first piston in the fully actuated position and simultaneously position the second piston in the fully retracted position.

9. The apparatus of claim 1, wherein the first piston and the second piston are positioned in alignment on a same axis, on opposite sides of the rotary shaft.

10. The apparatus of claim 9, wherein a distal end of the first piston is configured to move outward and away from a distal end of the second piston.

11. The apparatus of claim 1, wherein the electromagnetic module includes a Halbach array and a stator cooperating with the Halbach array for the generation of electrical power.

12. The apparatus of claim 1, further comprising:
a tank coupled to the port;
an impeller coupled to the tank, wherein the impeller is driven by compressed air stored in the tank and controllably released from the tank;
the electromagnetic module comprising a magnetic flywheel positioned proximate the impeller, wherein the magnetic flywheel is driven by operation of the impeller.

* * * * *